(12) United States Patent
Beyda et al.

(10) Patent No.: US 10,458,452 B2
(45) Date of Patent: Oct. 29, 2019

(54) TENSION ROD AND PIVOTABLE END CAPS FOR USE THEREWITH

(71) Applicant: TOWN & COUNTRY LINEN CORP., New York, NY (US)

(72) Inventors: Jeffrey Beyda, New York, NY (US); Robert Passaretti, New York, NY (US); Gina Barnaba, New York, NY (US)

(73) Assignee: TOWN & COUNTRY LINEN CORP., New York, NY (US)

( * ) Notice: Subject to any disclaimer, the term of this patent is extended or adjusted under 35 U.S.C. 154(b) by 68 days.

(21) Appl. No.: 15/895,322

(22) Filed: Feb. 13, 2018

(65) Prior Publication Data

US 2019/0249701 A1    Aug. 15, 2019

(51) Int. Cl.
  *F16B 7/14*   (2006.01)
  *A47K 3/38*   (2006.01)
  *A47H 1/022*  (2006.01)

(52) U.S. Cl.
  CPC ........... *F16B 7/1427* (2013.01); *A47H 1/022* (2013.01); *A47K 3/38* (2013.01); *F16B 7/1463* (2013.01)

(58) Field of Classification Search
  CPC .......... F16B 7/1427; A47H 1/022; A47K 3/38
  USPC .............................................................. 4/610
  See application file for complete search history.

(56) References Cited

U.S. PATENT DOCUMENTS

| | | | |
|---|---|---|---|
| 9,271,592 B2* | 3/2016 | Didehvar | A47H 1/022 |
| 10,024,347 B2* | 7/2018 | Bertrand | F16B 7/1427 |
| 10,098,508 B1* | 10/2018 | Switzer | A47K 3/38 |
| 2006/0249638 A1* | 11/2006 | Ehrke | A47K 10/08 248/205.5 |
| 2012/0285914 A1* | 11/2012 | Carney | A47H 1/022 211/123 |
| 2016/0206126 A1* | 7/2016 | Ford | A47K 3/38 |
| 2019/0082875 A1* | 3/2019 | Scanlon | A47K 3/38 |

OTHER PUBLICATIONS

"Camalot." *Wikipedia*, Wikimedia Foundation, 2000.

* cited by examiner

*Primary Examiner* — Tuan N Nguyen
(74) *Attorney, Agent, or Firm* — Leason Ellis LLP

(57) ABSTRACT

A tension rod has end caps that are configured such that the end caps expand when downward pressure is applied to the rod whereby enhanced tension is generated resulting in the tension rod being securely attached to the support structure, such as opposing walls.

24 Claims, 42 Drawing Sheets

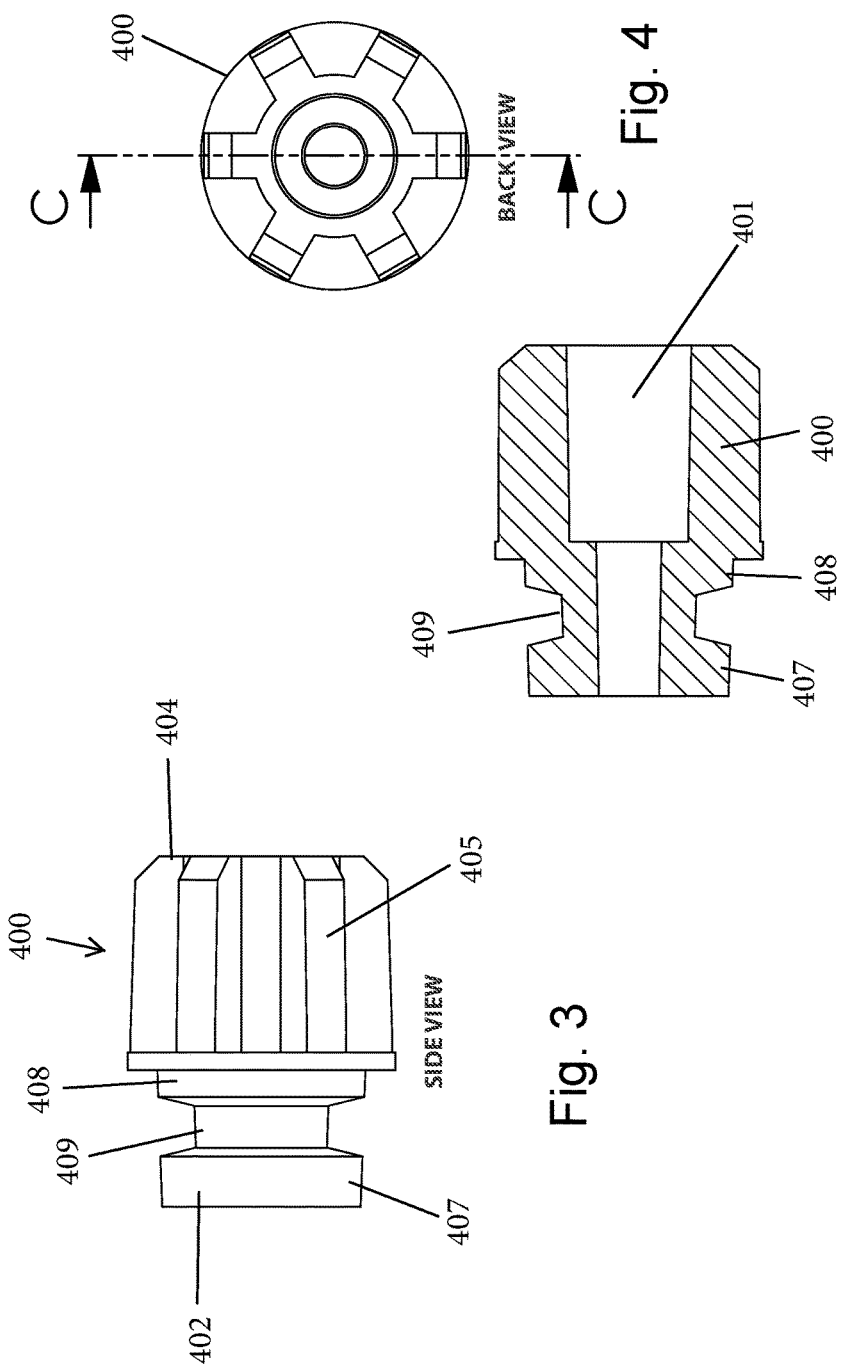

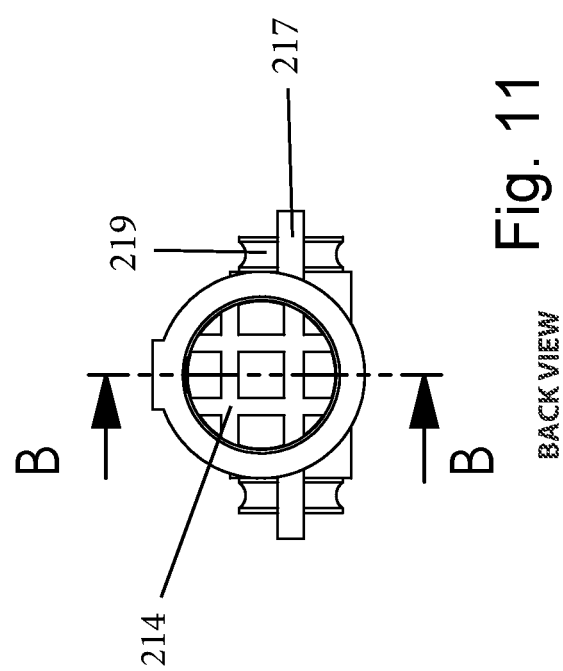

SECTION B-B
SCALE 1:1

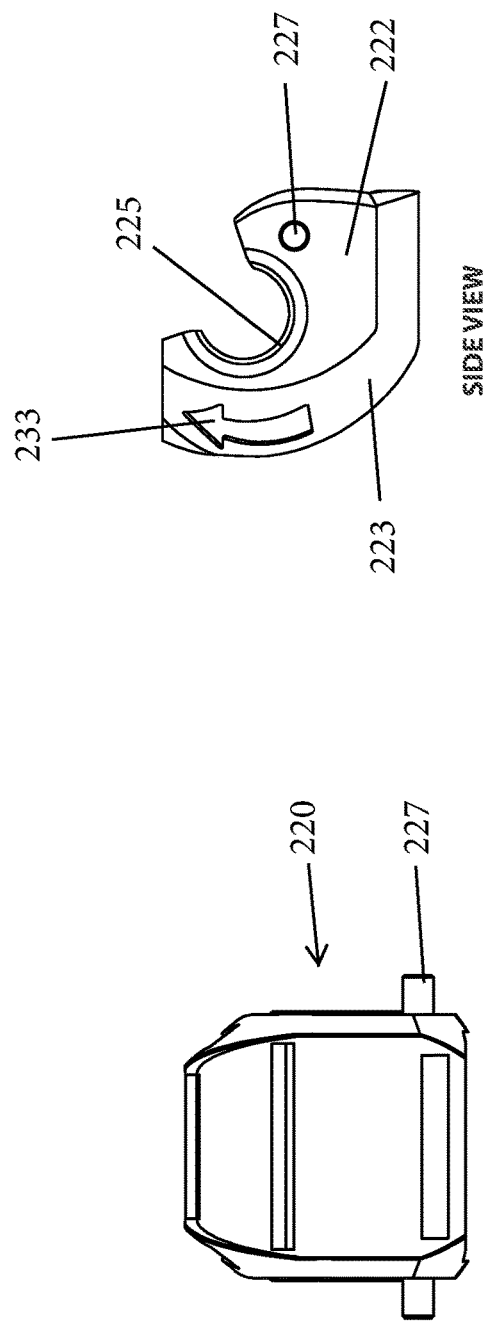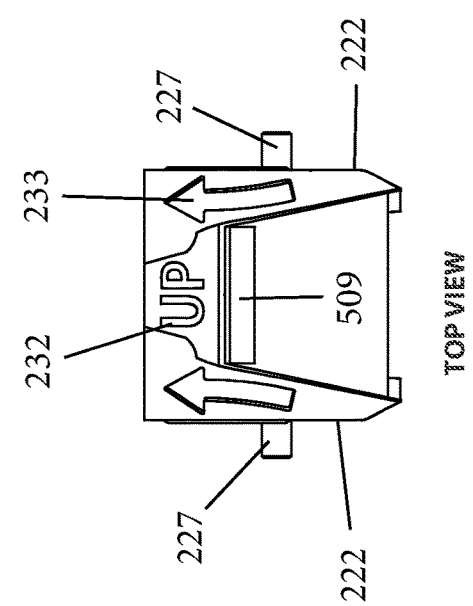

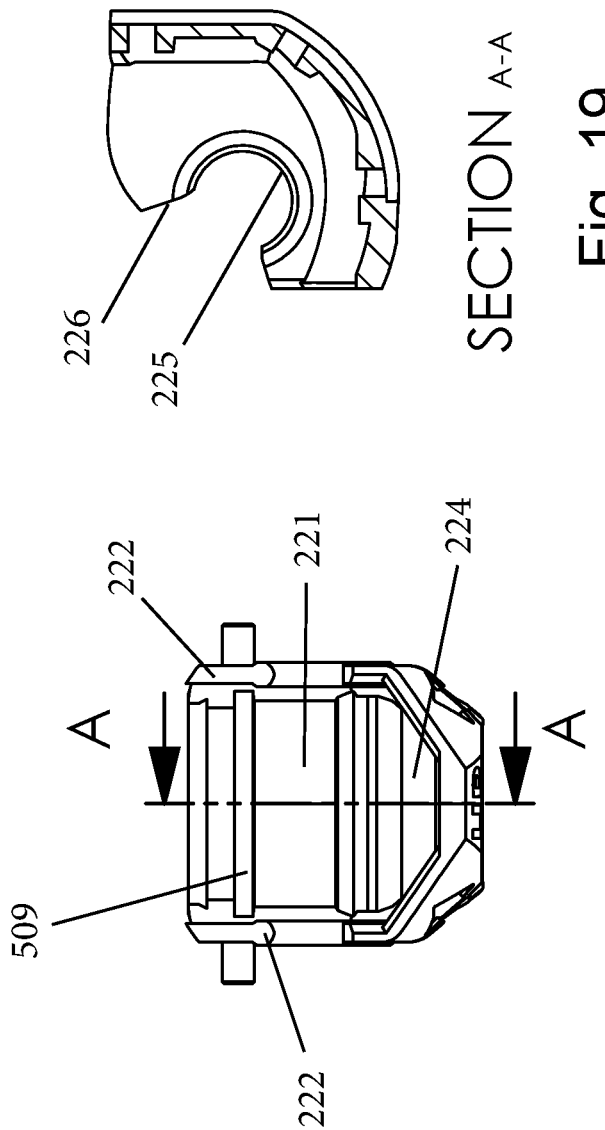

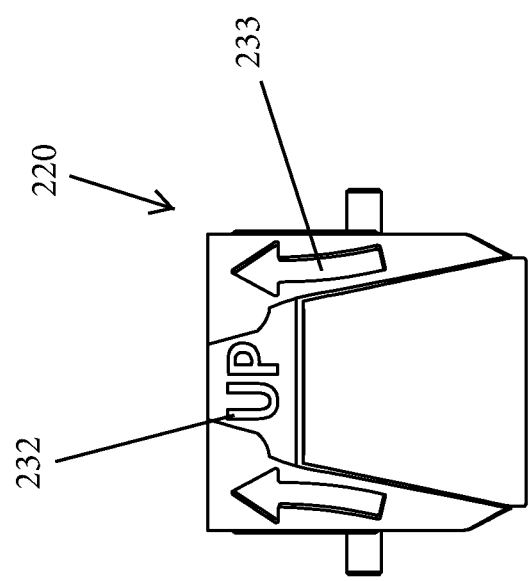

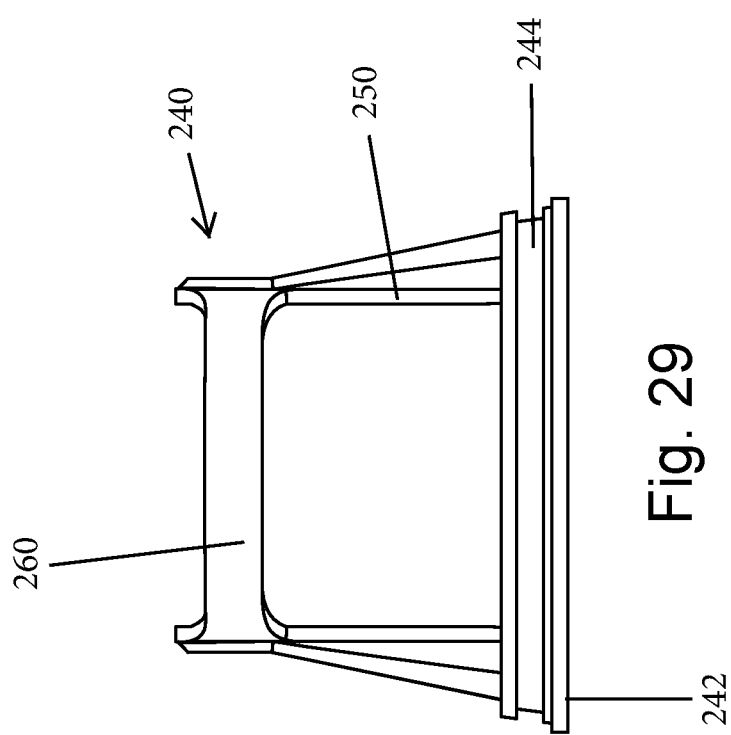

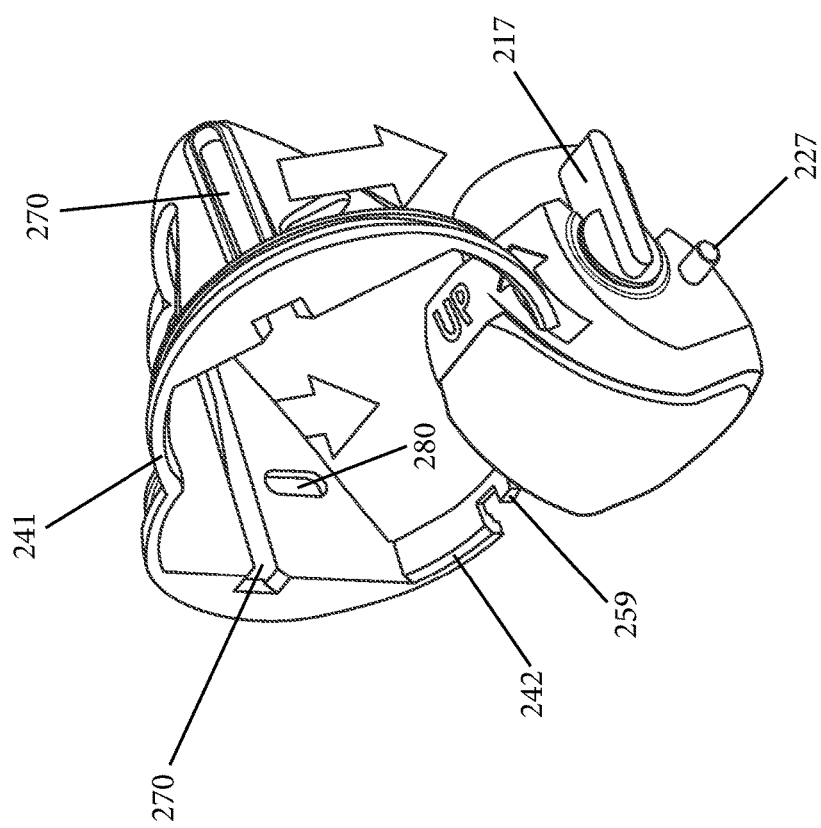

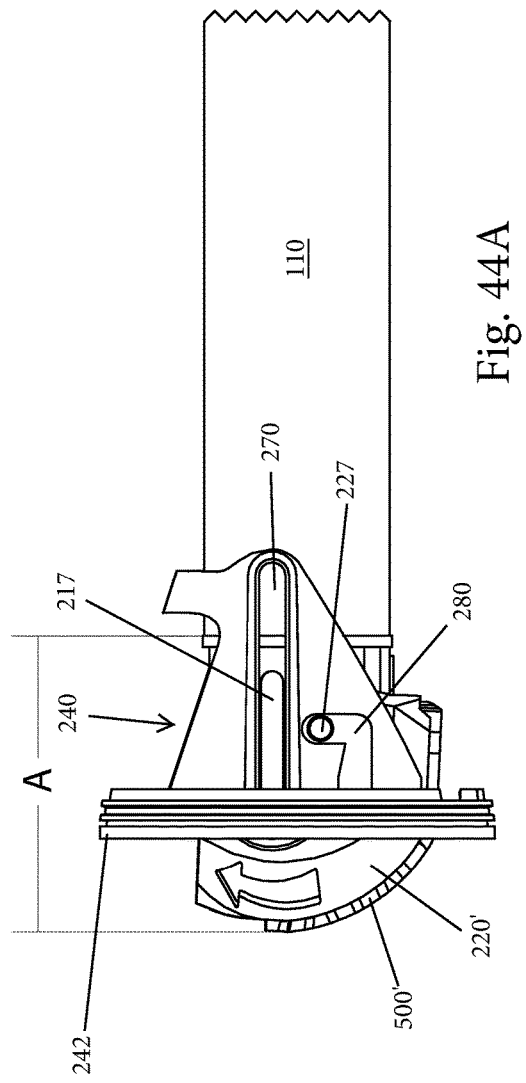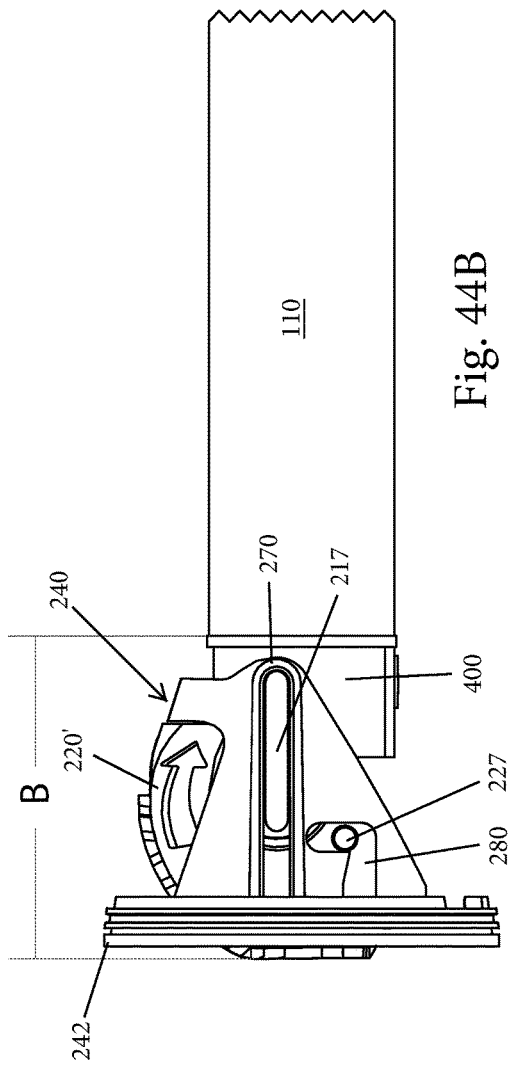
Fig. 44A
Fig. 44B

TENSION ROD AND PIVOTABLE END CAPS FOR USE THEREWITH

TECHNICAL FIELD

The present invention relates to support structures configured to hold and support one or more objects and more specifically, relates to a tension rod that has end caps that are configured such that the end caps expand when downward pressure is applied to the rod whereby enhanced tension is generated resulting in the tension rod being securely attached to the support structure, such as opposing walls.

BACKGROUND

Tension rods are commonly used in many different settings including in a number of different household applications. For example, a tension rod can be used to support drapery, shower curtains, etc. Most, if not all, tension rods are great, non-permanent option for many applications. As one would expect, a tension rod uses tension to stay in place and therefore, no screws, hooks or other fasteners of any kind are used. Tension rods are conventionally spring loaded, and they can be adjusted to exactly the right width for the application which may be a window frame or between two walls in bathroom or closet, etc. Tension rods need to be adjusted to create a tight fit, which keeps the rod in place. Traditional tension rods typically use rubber tips on either end help to keep the rod from slipping and also serve to protect the wall(s) or trim from damage. While hanging of drapery and shower curtains are two exemplary uses of tension rods, there are a wide of other applications, including but not limited to hanging clothing or otherwise holding and suspending articles or even using the tension rods in organizational applications.

SUMMARY

A tension rod in accordance with one embodiment of the present invention includes a first rod having one end defining a first end of the tension rod and a second rod having one end defining a second end of the tension rod. The second rod has a diameter greater than the first rod to allow the second rod to at least partially receive the first rod. The tension rod includes a first plug that is coupled to the first end of tension rod and a second plug that is coupled to the second end of the tension rod. A first end cap is rotatably coupled to the first plug and a second end cap is rotatably coupled to the second plug. As described herein, each of the end caps includes a cam mechanism that is configured to engage a support surface and place the tension rod under tension.

Each of the first end cap and the second end cap includes a main mount that is configured to be rotatably coupled to one of the first plug and the second plug. The cam mechanism that is part of the end cap includes a knuckle that is pivotally coupled to the main mount so as to pivot between a first position and a second position. The knuckle has an outer surface that is configured to selectively contact a support surface against which the tension rod is mounted and the cam mechanism is configured such that when a downward force is applied to the tension rod, the cam mechanism is engaged and the knuckle pivots to the second position, whereby the end cap applies a force to the tension rod resulting in the tension rod being placed under tension.

The present invention is also directed to the end cap itself and the end cap can be manufactured separate from and at a remote location from the manufacture of the tension rod parts and/or the final assembly location at which the end caps are rotatably coupled to the ends of the tension rod.

BRIEF DESCRIPTION OF DRAWING FIGURES

FIG. 3 is a side elevation view of a first plug;

FIG. 4 is a rear view of the first plug;

FIG. 5 is a cross-sectional view taken along the line C-C of FIG. 4;

FIG. 11 is a rear elevation view thereof;

FIG. 15 is a front elevation view of a first knuckle;

FIG. 16 is a side elevation view thereof;

FIG. 17 is a top plan view thereof;

FIG. 18 is a rear elevation view thereof;

FIG. 19 is a cross-sectional view taken along the line A-A of FIG. 18;

FIG. 24A is a top plan view of the first knuckle with the first grip member;

FIG. 29 is a top plan view thereof;

FIG. 37A is a side perspective view showing assembly of a finial ring mount according to a second type to the first knuckle;

FIG. 44A shows a side elevation view showing the end cap with the finial ring mount of the first type and the second knuckle both being located in a first position; and FIG. 44B shows a side elevation view showing the end cap with the finial ring mount of the first type and the second knuckle both being located in a second position.

DETAILED DESCRIPTION OF THE DRAWING FIGURES

Figure 1:
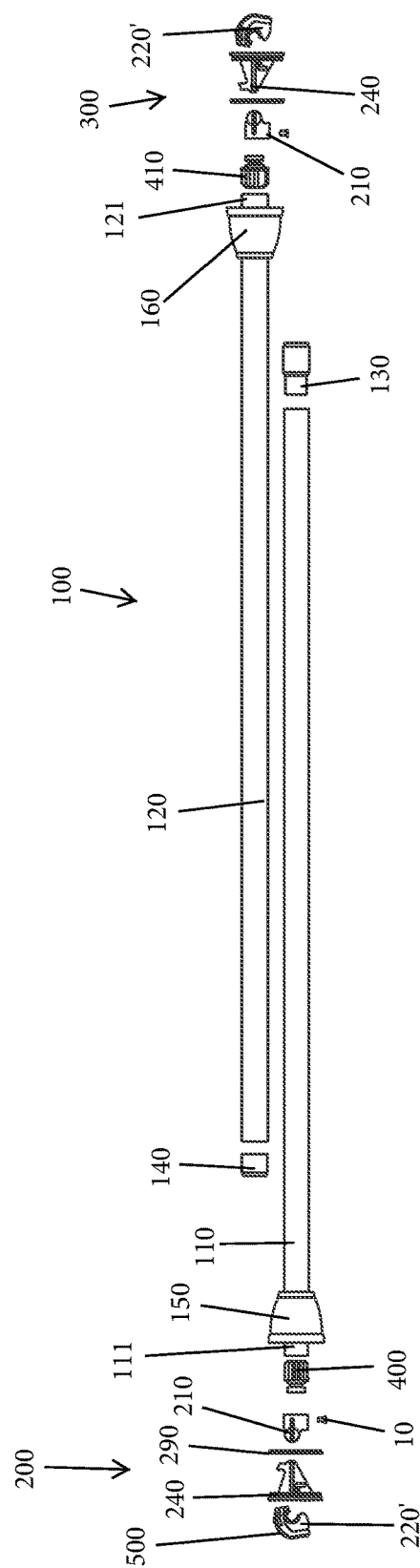
FIG. 1 is an exploded side elevation view of a tension rod in accordance with one embodiment of the present invention.
Figure 2A:
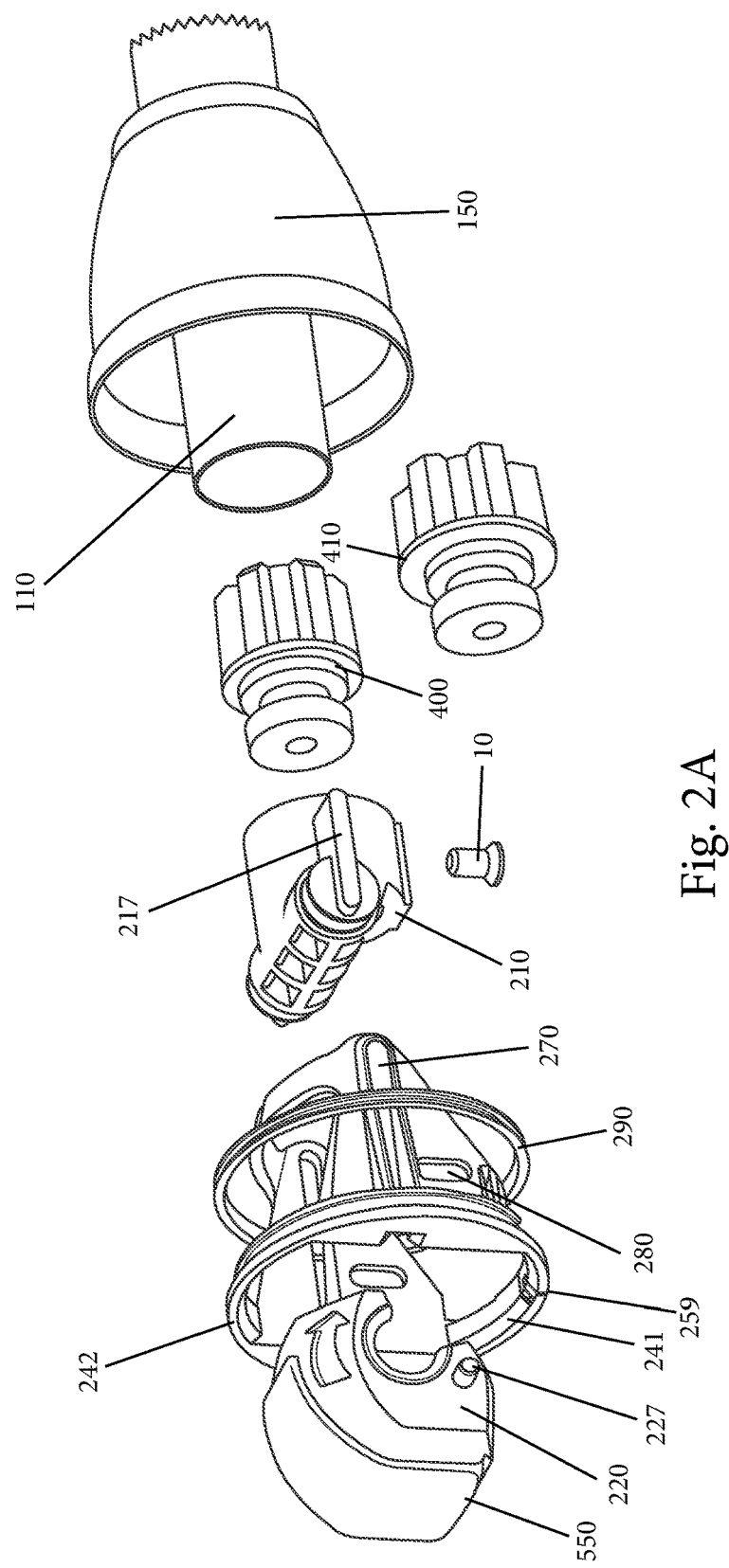
FIG. 2A is an exploded perspective view of an end cap in accordance with one embodiment of the present invention.
Figure 2B:
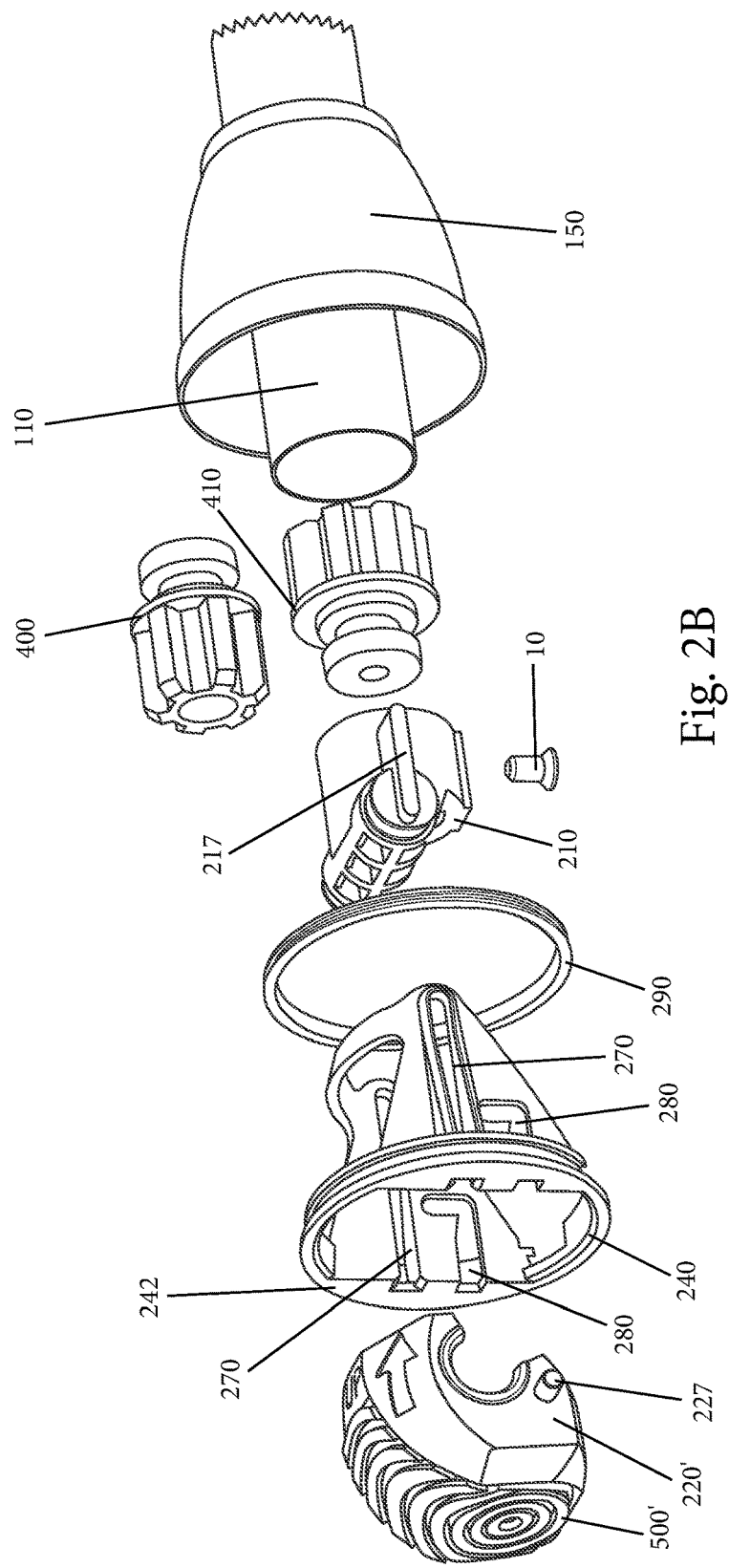
FIG. 2B is an exploded perspective view of an end cap in accordance with another embodiment of the present invention.

FIGS. 1-44B illustrate a tension rod 100 according to an exemplary embodiment. The tension rod 100 is formed of an elongated first rod 110 and an elongated second rod 120. One of the first rod 110 and the second rod 120 is smaller than the other so as to allow it to be received within the hollow interior of the other. In the illustrated embodiment, the elongated second rod 120 is depicted as being larger than the first rod 110. It will be appreciated that when assembled, one end 111 of the first rod 110 defines one end of the tension rod 100 and similarly, one end 121 of the second rod 120 defines the other end of the tension rod 100. Typically, the first and second rods 110, 120 have cylindrical shapes; however, other shapes are equally possible. The sizes, including diameters and lengths, of the first and second rods 110, 120 can likewise be selected in view of the intended application. Thus, for example, the length of the first rod 110 can be the same as the length of the second rod 120. In the illustrated embodiment, the first rod 110 has a smaller diameter than the diameter of the second rod 120.

The first rod 110 and the second rod 120 are coupled to one another using conventional techniques and is such a way that the first rod 110 and the second rod 120 can be selectively locked together. For example, a cam lock type mechanism can be used and more particularly, a cam member 130 and a transition ring 140 can be used. A transition ring 140 is also provided to make a smooth transition from the larger diameter pole (rod) to the smaller diameter pole (rod). The cam member 130 can be configured such that rotation of one of the first rod 110 and the second rod 120 relative to the other causes a releasable locking of the first rod 110 and the second rod 120. It will be again understood that other locking mechanisms can be used.

Typically, the tension rod 100 includes a first finial 150 at the first end 111 of the tension rod 100 and a second finial 160 at the second end 121 of the tension rod 100. The finials 150, 160 thus surround the first rod 110 and second rod 120, respectively, and can be slidably coupled thereto. As is known, the first finial 150 and the second finial 160 are used as decorative ornaments at the ends of the first rod 110 and the second rod 120. In illustrated embodiment, the first finial 150 and the second finial 160 has a tapered (frustoconical) shape. The first finial 150 and the second finial 160 can be the same part. As will be understood, the construction of the finials 150, 160 is not critical and these parts can come in many different sizes, shapes, finishes, etc.

In accordance with the present invention, a first end cap 200 and a second end cap 300 are provided each of which is configured such that the second end cap 200 and the third end cap 300 expand when downward pressure is applied to the tension rod 100 (e.g., to the outer second rod 120), whereby enhanced tension is generated resulting in the tension rod 100 being securely attached to the support structure, such as between two facing walls.

The first end cap 200 and the second end cap 300 are very similar or identical in construction and therefore, the first end cap 200 will be described in detail below and then the differences between the first end cap 200 and the second end cap 300 will be noted. It will be understood that like elements are numbered alike.

The first end cap 200 (and the second end cap 300) is formed as an assembly of a number of parts and therefore, it will be appreciated that the first end cap 200 and the second end cap 300 can be manufactured and assembled separate from the manufacturing and assembly of the tension rods 110, 120 and for that matter the final assembly of the tension rod 100 itself. Thus, one supplier can make and assemble the first and second end cap 200, 300 and then these assembled subassemblies can then be delivered to another location for final assemble of the tension rod 100 in which the first end cap 200 is attached to the first end 111 and the second end cap 300 is attached to the second end 121.

The first end cap 200 is coupled to the first end 111 by use of a first plug 400 and the second end cap 300 is coupled to the second end 121 by use of a second plug 410. The first plug 400 and the second plug 410 have identical constructions with the exception that the dimensions of the first plug 400 is different from the dimensions of the second plug 410 as a result of the difference in dimensions between the first rod 110 and the second rod 120. More specifically and as previously mentioned, the first rod 110 has a smaller diameter than the second rod 120 and therefore, the first plug 400 has a reduced (smaller) dimensions than the second plug 410 since the first plug 400 is configured for secure insertion into the open first end 111 of the first rod 110 and the second plug 410 is configured for secure insertion into the open second end 121 of the second rod 120. More specifically, only the portion of the first plug 400 that is to be inserted into the first rod 110 has smaller dimensions that the corresponding portion of the second plug 410 that is to be inserted into the second rod 120. Otherwise, the plugs 400, 410 can have identical constructions.

Since the first plug 400 and the second plug 410 have the same constructions, only the first plug 400 is described in detail herein; however, like elements are numbered alike and therefore the same parts of the first plug 400 and the second plug 410 are numbered alike. FIGS. 3-5 illustrate the first plug 400 and FIGS. 6-8 illustrate the second plug 410.

The first plug 400 has a first end 402 and an opposite second end 404 and can be a hollow structure with a through hole or bore 401 extending the entire length thereof. The second end 404 is the end to be inserted into the hole at the first end 111 and thus, the second end 404 can have a cylindrical shaped body with a plurality of longitudinal ribs 405 that are circumferentially spaced apart from one another. A friction fit can thus be formed between the second end 404 and the first rod 110 resulting in a secure attachment between the first plug 400 and the first rod 110. It will be appreciated that other types of fit can be formed between the rod and the plug. For example, a crimping method can be used to secure the plug to the pole. The crimping method can be where the factory inserts the plug into the metal pole/rod then stamps several points radially around the end of the pole/rod. These stamped points push into the plastic pole plug and restrict the plug from coming out. The portion of the first plug 400 at the first end 402 has a reduced diameter and includes a center post having a first annular shaped flange 407 and a second annular shaped flange 408 that is spaced apart from the first annular shaped flange 407 such that an annular shaped space 409 is formed therebetween. The widths (thickness) of the first annular shaped flange 407 and the second annular shaped 408 can differ.

As mentioned, the second plug 410 has the same configuration and make-up as the first plug 400 but the end portion at the second end 404 has a larger diameter to allow reception within the larger diameter second rod 120.

Figure 7:
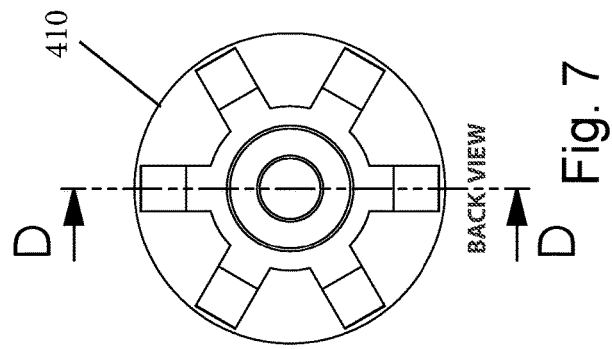
FIG. 7 is a rear view of the second plug.
Figure 8:
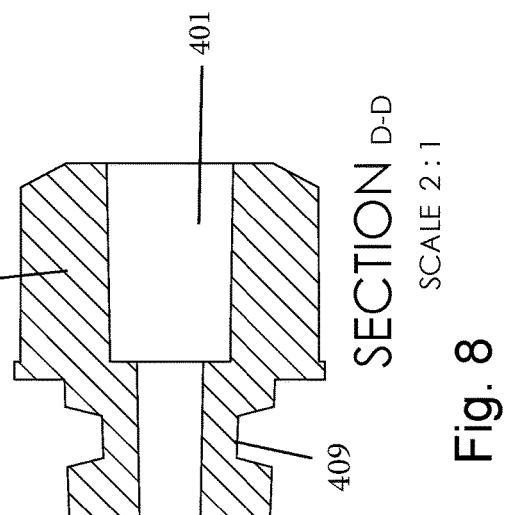
FIG. 8 is a cross-sectional view taken along the line D-D of FIG. 7.
Figure 6:
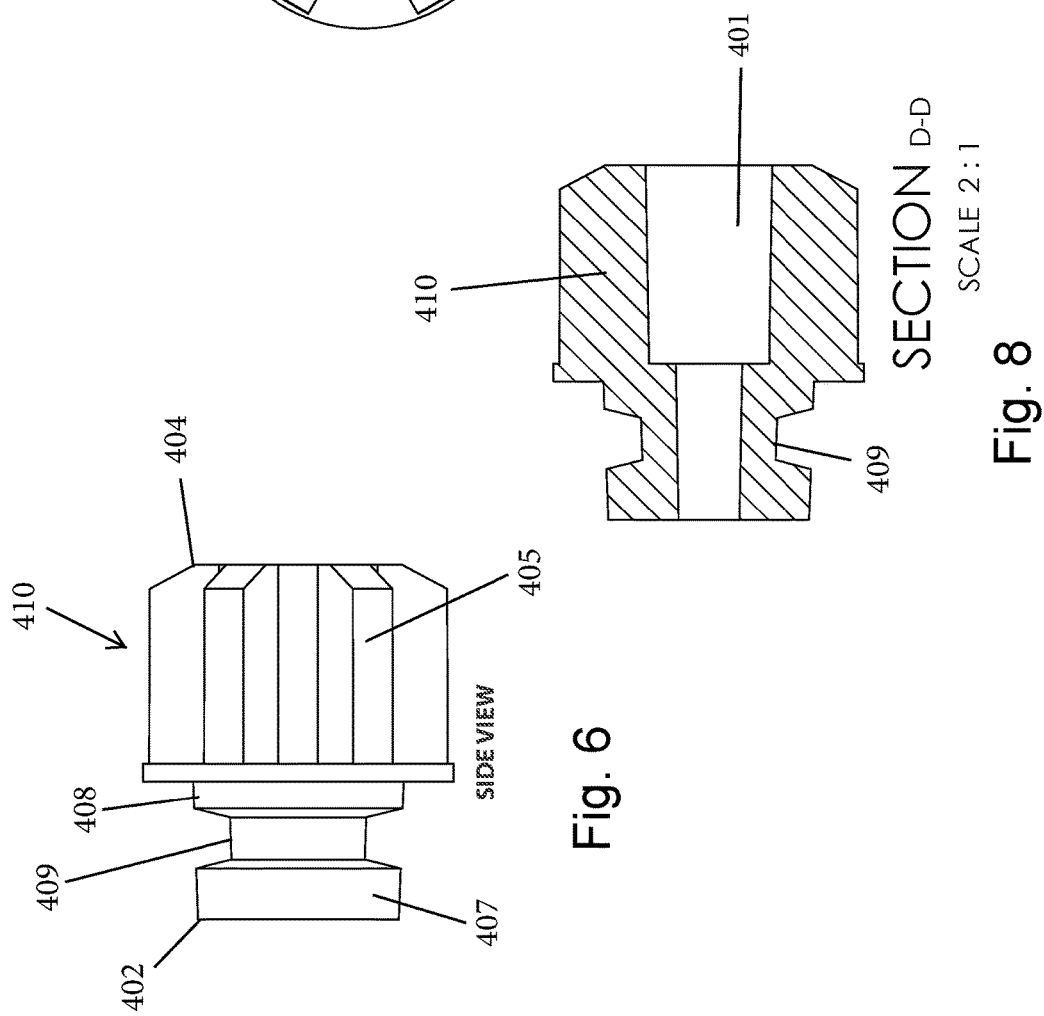
FIG. 6 is a side elevation view of a second plug.
Figure 9:
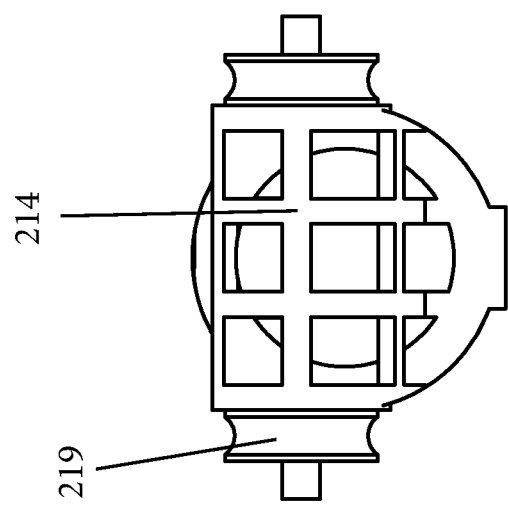
FIG. 9 is a front elevation view of a main mount.
Figure 10:
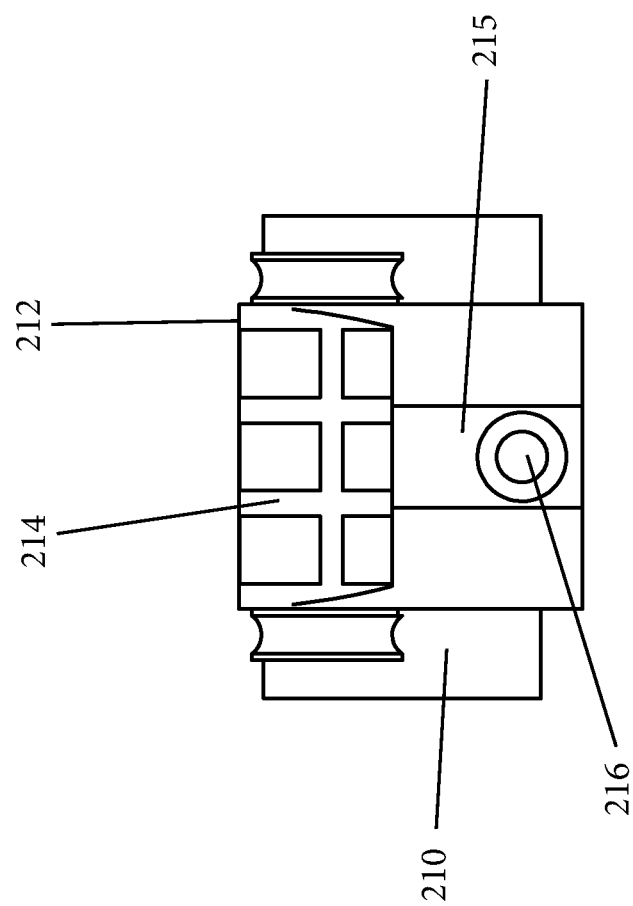
FIG. 10 is a bottom plan view thereof.
Figure 13:
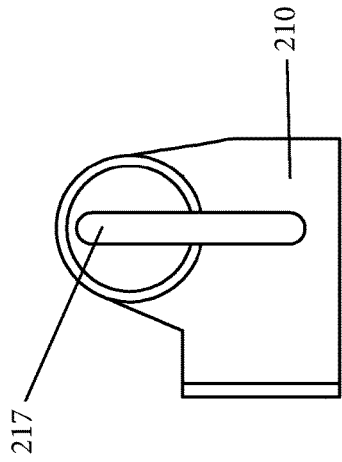
FIG. 13 is a side elevation view thereof.

FIG. 6-8 illustrate the second plug 410 which has a wider base since it is received within the larger rod 120. However, the other components and features are the same and thus numbered alike compared to the first plug 400.

It will be appreciated that the two end caps 200, 300 and the two plugs 400, 410 can be packaged together at one site and delivered to a second site for assembly to the first rod 110 and the second rod 120. As described below, the first end cap 200 is constructed to mate and attach to the first plug 400 and the second end cap 300 is constructed to mate and attach to the second plug 410.

Figure 14:
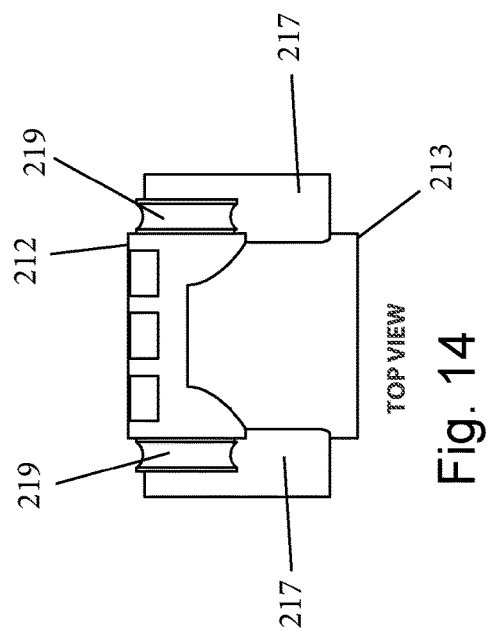
FIG. 14 is a top plan view thereof.
Figure 12:
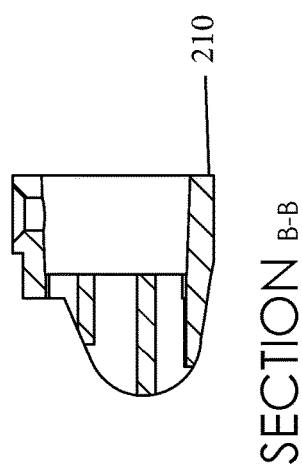
FIG. 12 is a cross-sectional view taken along the line B-B of FIG. 11.
Figure 21:
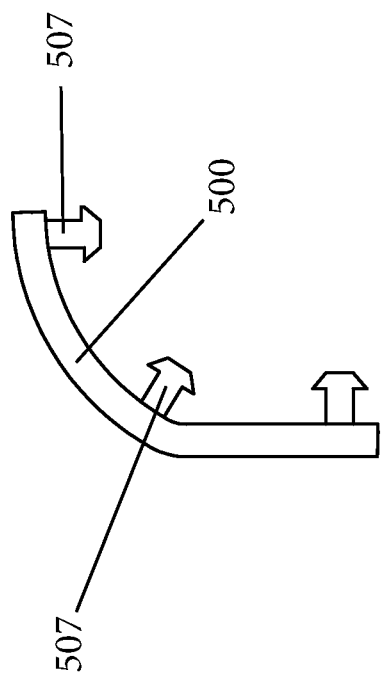
FIG. 21 is a side elevation view thereof.
Figure 20:
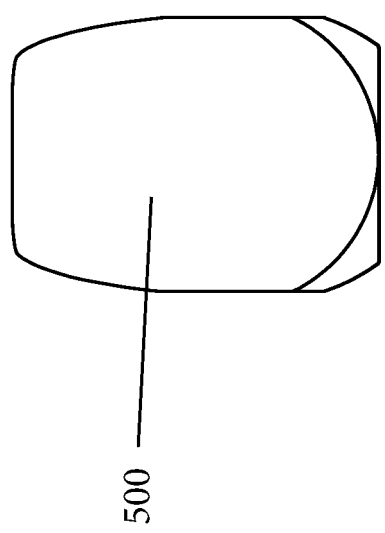
FIG. 20 is a front elevation view of a first grip member for use with the first knuckle.
Figure 22A:
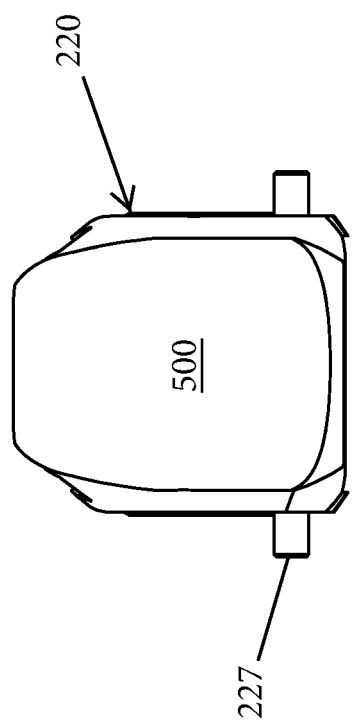
FIG. 22A is a front elevation view of the first knuckle with the first grip member installed.
Figure 22B:
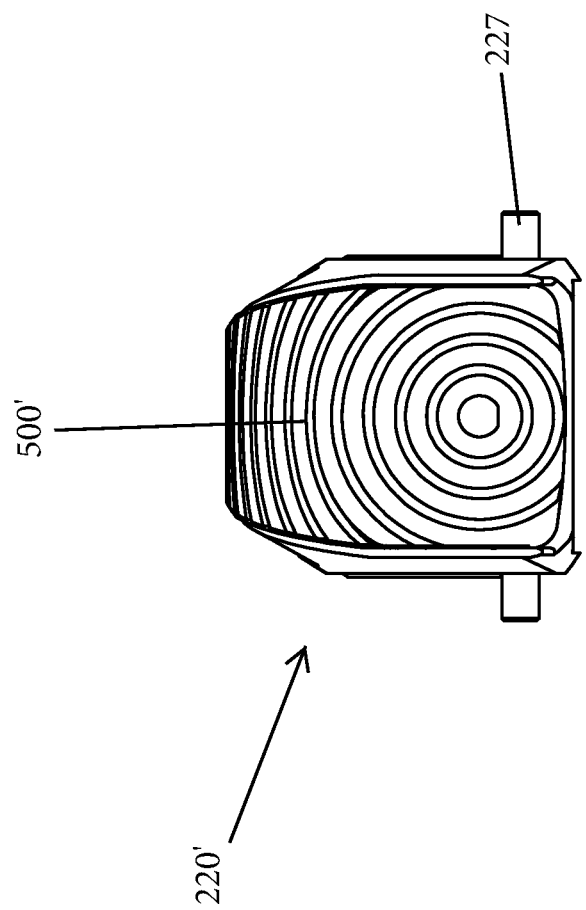
FIG. 22B is a front elevation view of a second knuckle with a second grip member.
Figure 23A:
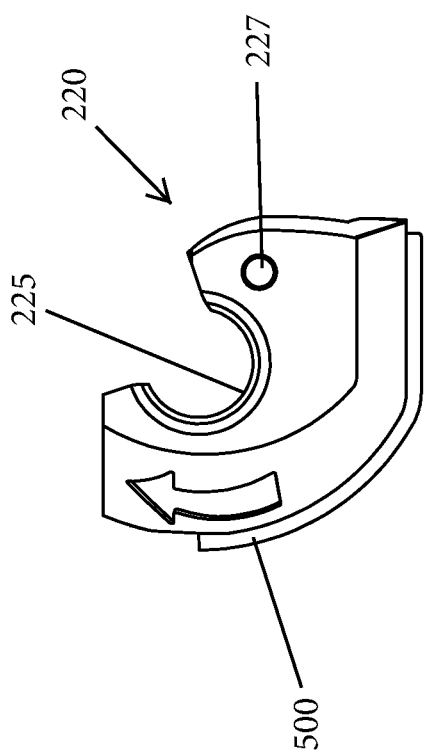
FIG. 23A is a side elevation view of the first knuckle with the first grip member.
Figure 23B:
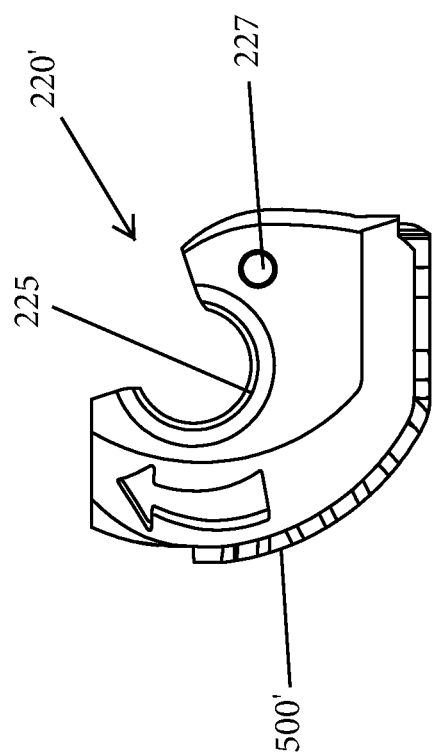
FIG. 23B is a side elevation view of the second knuckle with the second grip member.
Figure 24B:
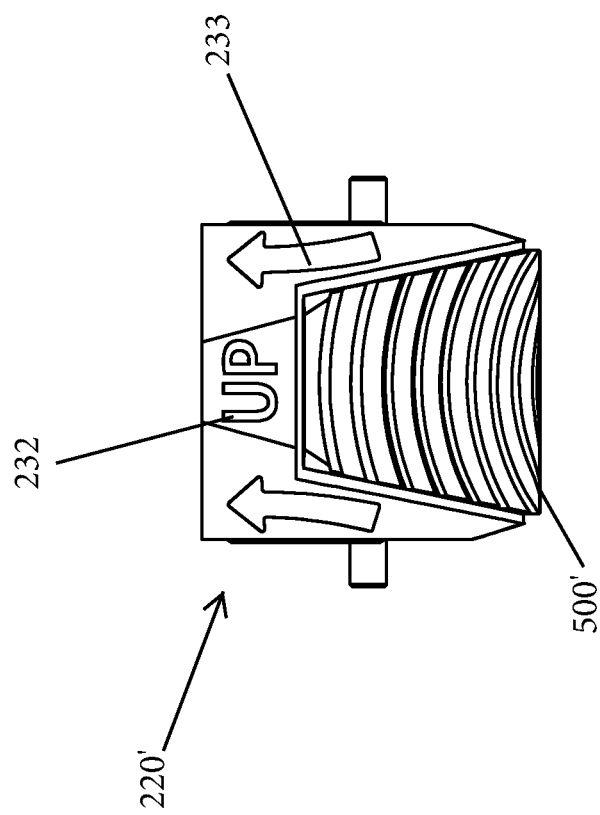
FIG. 24B is a top plan view of the second knuckle with the second grip member.
Figure 25A:
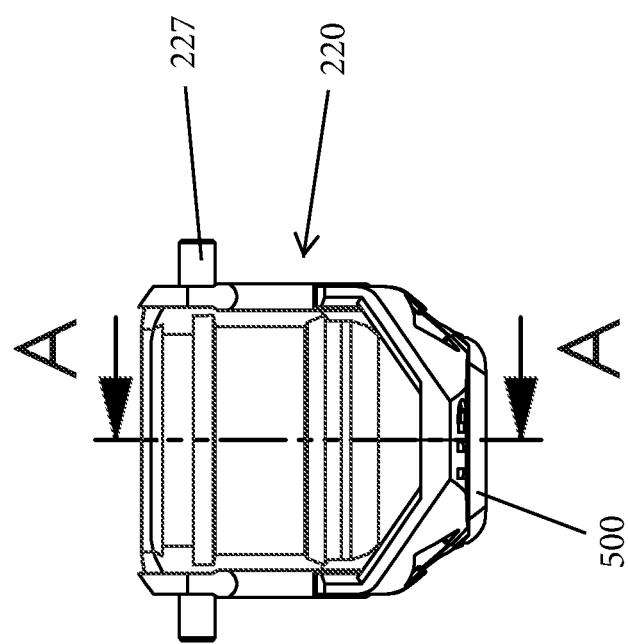
FIG. 25A is a rear elevation view of the first knuckle with the first grip member.
Figure 25B:
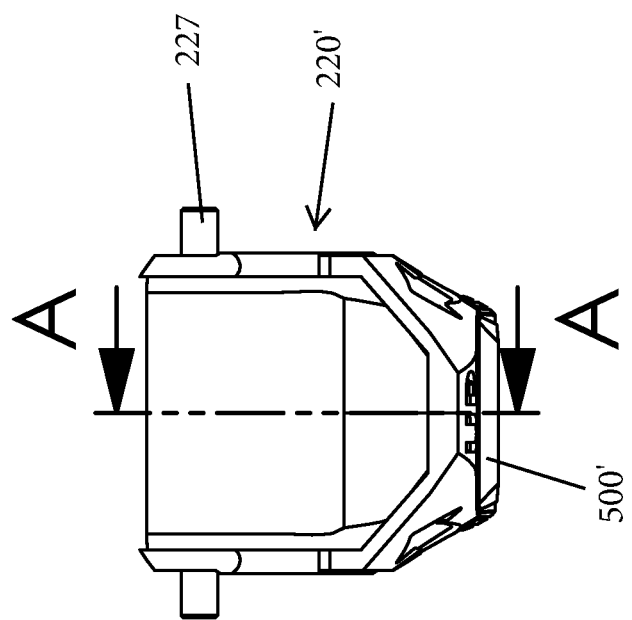
FIG. 25B is a rear elevation view of the second knuckle with the second grip member.
Figure 26A:
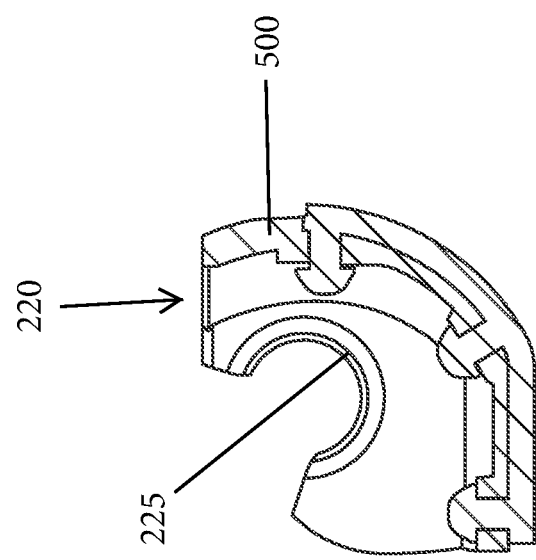
FIG. 26A is a cross-sectional view taken along the line A-A of FIG. 25A.
Figure 26B:
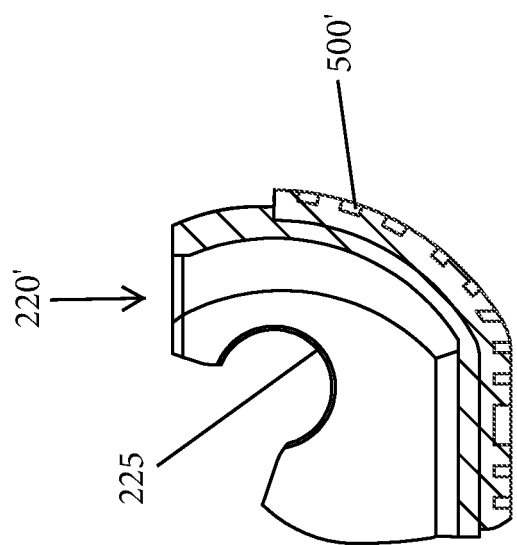
FIG. 26B is a cross-sectional view taken along the line A-A of FIG. 25B.

As shown in the figures, the first end cap 200 has a main mount 210 that has a first end 212 and an opposite second end 213 (FIG. 14). The main mount 210 is generally hollow structure with an opening at the second end 213. In particular, the hollow interior of the main mount 210 can have a cylindrical shape. The hollow interior (bore formed in the body of the main mount 210) terminates at web 214 (which can be a grid-like structure with interstices (bounded holes)). Along an outer surface of the main mount 210 which is curved in shape is a planar landing 215 that includes a through hole 216 that passes through the landing 215 into the hollow interior of the main mount 210. The hollow interior of the main mount 210 is sized and shaped to receive the first end 402 of the first plug 400. As shown in the figures, the body of the main mount 210 can include a pair of fins (slide fingers) 217 that in the illustrated embodiment are located opposite (180 degrees) one another and extend longitudinally along the sides of the body of the main mount 210. The body of the main mount 210 also includes a pair of arcuate shaped slots 219 that are formed in circular shaped side protrusions 211 that are bisected by the pair of fins 217. The web 214 is located between the pair of circular shaped side protrusions 211.

When the first end 402 of the first plug 400 is inserted into the hollow interior of the body of the main mount 210, the forward face of the first annular shaped flange 407 contacts the web 214 which acts as a stop (e.g., FIG. 11). In this fully inserted position, the through hole 216 is axially aligned with the annular shaped space 409. To couple the main mount 210 to the first plug 400 in a way that permits free rotation of the main mount 210 relative to the first plug 400, a fastener 10 is threaded through the through hole 216 into the annular shaped space 409 such that the distal end of the fastener 10 lies between the first annular shaped flange 407 and the second annular shaped flange 408 but does not contact the plug body (floor of the recess). By disposing the fastener 10 into the annular shaped space 409, lateral movement between the main mount 210 and the first plug 400 is constrained; however, free rotation is permitted between the two. As will be described herein, the first plug 400 is intended to remain stationary and not rotate while the main mount 210 is intended to rotate as part of rotation of the first end cap 200.

The first end cap 200 also includes a knuckle 220 that is configured to be rotatably coupled to the main mount 210. FIGS. 15-21, 22A, 23A, 24A, 25A and 26A illustrate one knuckle (a first knuckle) 220, while FIGS. 22B, 23B, 24B, 25B and 26B illustrate another knuckle (a second knuckle) 220'. As described herein, the main difference between the knuckle 220 and the knuckle 220' is that the grip part (discussed below) that is used with the knuckle 220 is a separate part and is mated thereto, while in the knuckle 220', the grip part is integrally formed during a manufacturing process and is not a defined separate part that is subsequently mated to the knuckle.

The knuckle 220 is a hollow body that has an arcuate shape. In general, the knuckle 220 can be thought of as having a center portion 221 and a pair of side walls 222, with the center portion 221 extending between the pair of side walls 222. The knuckle 222, including the center portion 221 and the pair of side walls 222, has an outer face or surface 223 and an inner face or surface 224.

Figure 35:
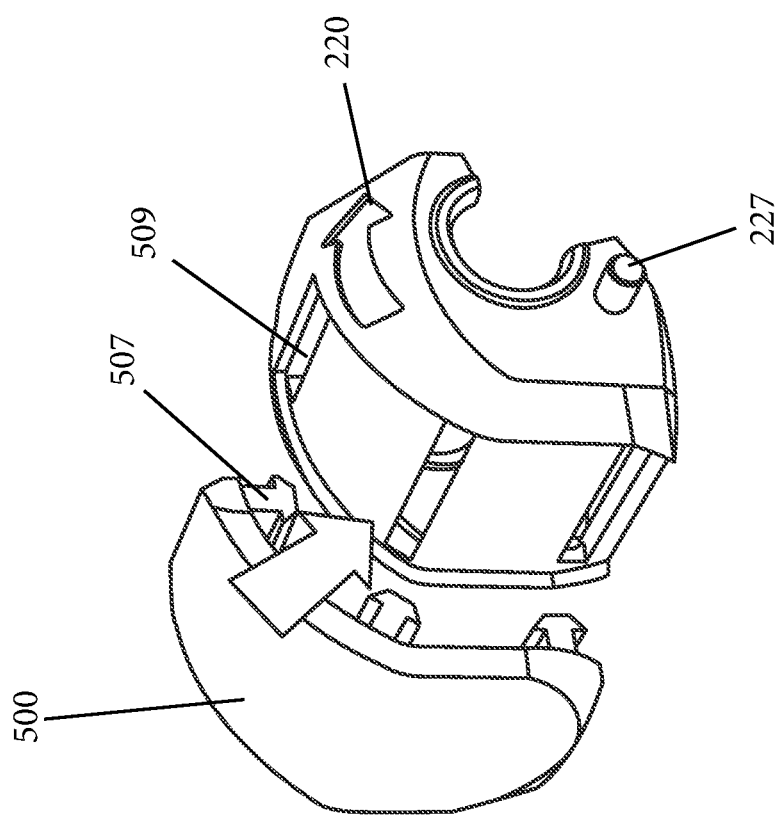
FIG. 35 is a side perspective view showing assembly of the grip member to the first knuckle.
Figure 36:
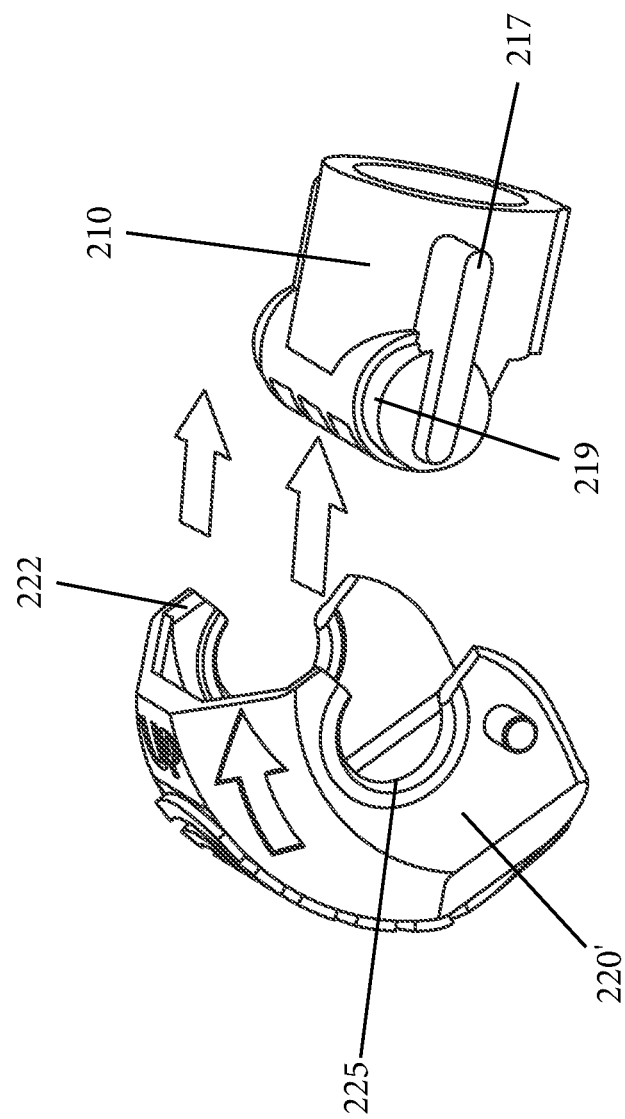
FIG. 36 is a side perspective view showing assembly of the second knuckle to the main mount.
Figure 37C:
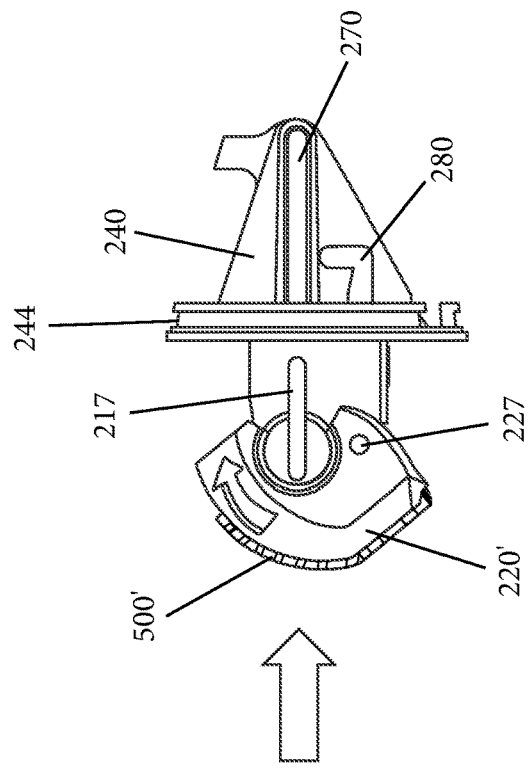
FIG. 37C is a side elevation view showing assembly of a finial ring mount according to the first type to the second knuckle.
Figure 37B:
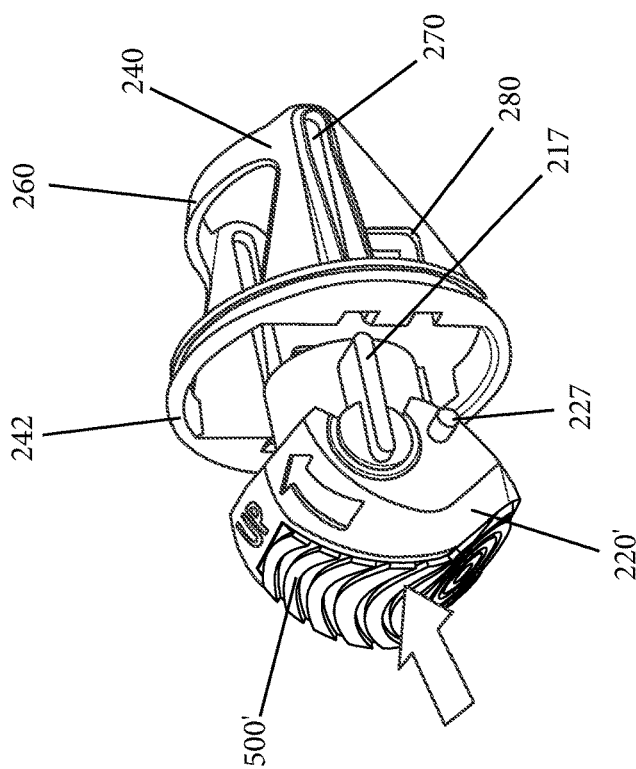
FIG. 37B is a side perspective view showing assembly of a finial ring mount according to the first type to the second knuckle.
Figure 38:
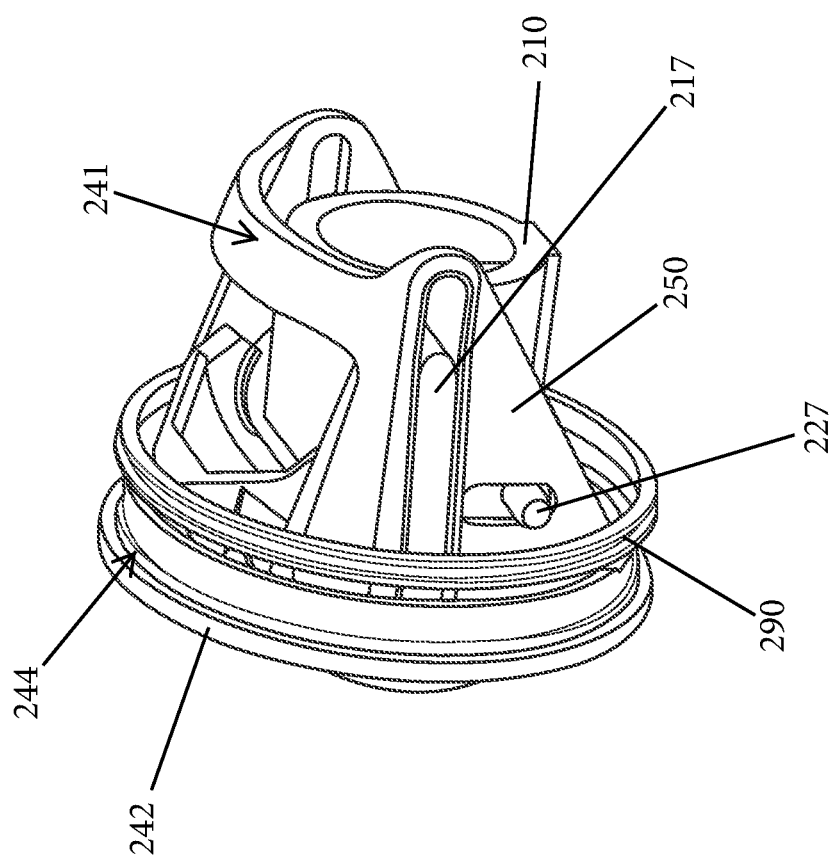
FIG. 38 shows installation of the seal member onto the finial ring mount according to the second type.

In one embodiment, the outer face 223 of the center portion 221 can include a recessed portion or inlay that receives a grip member 500. The grip member 500 can be formed as a separate part that is inlaid within the recessed portion and secured therein using conventional techniques, such as bonding (adhesives), a mechanical fit, etc. For example, as shown in FIG. 35, the grip member 500 can be snap-fittingly mated to the knuckle 220 and more particularly, the underside of the grip member 500 can include a plurality of locking protrusions 507 that protrude outwardly therefrom. The locking protrusions 507 can be in the form of locking rails that extend across the width of the grip member 500 and each includes a locking head (e.g., arrow shaped). In the illustrated embodiment, there are three locking protrusions 507. The recessed portion (inlay) of the knuckle 220 includes matching locking slots (openings) 509 that receive the locking protrusions 507 resulting in a snap-fit attachment between the fit member 500 and the knuckle 220.

The grip member 500 can thus be formed as a strip of material that is formed of a suitable material, such as rubber, silicon, TPR, etc. As shown, the grip member 500 can have a non-uniform width in that it can have a tapered construction. It will also be appreciated that the outer surface of the grip member 500 can have a grip pattern formed thereon. For example, the grip pattern can be raised dots, raised ribs, a wavy pattern, or other geometries that provide traction and grip. The grip pattern can also be flat or smooth.

The thickness of the grip member 500 is such that the outer surface of the grip member 500 extends beyond (above) the surrounding outer face of the center portion 221 so as to represent a gripping surface that contacts the support surface for holding the tension rod 100 in place between two opposing support surfaces. This construction is shown in the figures.

In another embodiment shown in FIGS. 22B, 23B, 24B, 25B and 26B, the grip member, identified as 500', is not a separate part that is disposed within an adhered to the recessed portion of the center portion 221. Instead, the grip member 500' can be formed as part of an overmold process. The grip member 500' can thus be formed from another material different from the material that is used to form the knuckle 220' itself. For example, when an overmold process or similar process is used, the grip member 500' can be formed of TPR or silicone; however, it will be understood that other materials can likewise be used. In the embodiment in which the grip member 500' is formed by the overmold process, the grip member 500' can include the grip pattern discussed above.

Each of the side walls 222 includes a notch 225 that is open along one edge 226 of the side wall 222. In the illustrated embodiment, the notch 225 has an arcuate shape and in particular the side edge that defines the notch 225 can extend greater than 180 degrees but less than 360 degrees as shown. The notches 225 of the pair of side walls 222 are opposite one another such that they face one another.

Along the outer face 223 of each side wall 222 there is a post 227 that extends radially outward from the side wall 222. The post 227 can be thought of as a pin and in the illustrated embodiment, the post 227 has a cylindrical shape; however, other shapes are possible. The post 227 is formed proximate one end of the notch 225, said one end being the end of the notch 225 furthest from the forward portion of the knuckle 220. It will be seen that the height of the knuckle is not uniform in that the forward portion has a greater height than the rearward portion. The two posts 227 are thus located opposite one another and are axially aligned.

The knuckle 220, 220' also has indicia that is intended to guide the user in moving the knuckle 220 as described below. In particular, the indicia can in the form of text 232, such as "UP" and also directional arrows 233 that guide the movement (rotation) of the knuckle 220. As shown, the heads of the directional arrows 233 point towards the end of the knuckle 220 that includes the text 232.

The inner surfaces of the knuckle 220, 220' can have a smooth finish with the knuckle 220 including the slots as described herein.

The first end cap 200 also includes a finial ring mount 240 according to a first type that is shown in FIGS. 2B, 27-31, 33, 34, 37B, 37C, 44A and 44B. Alternatively, a finial ring mount 241 according to a second type is shown in FIGS. 2A, 37A, 38 and 41-43. It will be understood that these finial ring mounts 240, 241 are constructed to be used with the same components, namely, the main mount, knuckle, and seal member. The finial ring mount 240 and finial ring mount 241 share many of the same features and therefore, like elements are numbered alike. The differences between the two are specifically called discussed herein.

The finial ring mount 240 and finial ring mount 241 each includes an annular shaped base 242 that defines one end of the finial ring mount 240. As shown in the side elevation view of FIG. 30A, the annular shaped base 242 has a stepped construction. Within the stepped construction, the annular shaped base 242 has an annular shaped receiving channel 244.

The annular shaped base 242 of the finial ring mount 241 (second type) is not a continuous annular structure but instead includes a break (clasp) 259 (FIG. 37A) formed therein. The break 259 is intended to allow the separation of the annular shaped base 242. The break 259 can have a keyed construction in that the two parts of the annular shaped base 242 mate with one another to form a releasably interlocked continuous structure. FIG. 37A shows the annular shaped base 242 in a separated position.

The finial ring mount 240 and finial ring mount 241 also each includes a pair of upstanding side walls 250 that extend upwardly (outwardly) from the annular shaped base 242. As shown, the pair of upstanding side walls 250 are integrally coupled to the inner face of the annular shaped base 242. The side walls 250 are thus mirror images of one another. A bridge 260 extends between the two side walls 250. The ends of the bridge 260 are preferably formed integral to the side walls 250. As shown, the bridge 260 can have an arcuate (curved) shape. The bridge 260, like the finial ring mount 240, is flexible and, in the case of especially the finial ring mount 241 can include an area or point of reduced thickness that allows the finial ring mount 241 to flex open in this specific area as when performing the step shown in FIG. 37B.

As shown, each side wall 250 can be generally triangular shaped.

Each side wall 250 has a first slot 270 and a second slot 280 formed therein. The first slot 270 extends in a first direction, while the second slot 280 extends in a second direction. The first and second directions can be orthogonal (perpendicular) to one another. However, it will be understood that that two directions do not have to be perpendicular to one another, and can be set at an angle other than 90 degrees. The first slot 270 can be thought of as extending a longitudinal direction (along the height of the side wall 250), while the second slot 280 can be thought of as extending in a latitudinal direction (along the width of the side wall 250). The dimensions of the first slot 270 and the second slot 280 can be different and as shown, the first slot 270 is longer and can be wider than the second slot 280. As shown in the figures, the first slot 270 can extend to the stepped construction of the annular shaped base 242 and the end of the first slot 270 that terminates at the annular shaped base 242 can be linear (planar), while the opposite end of the first slot 270 can be a curved end.

Figure 27:
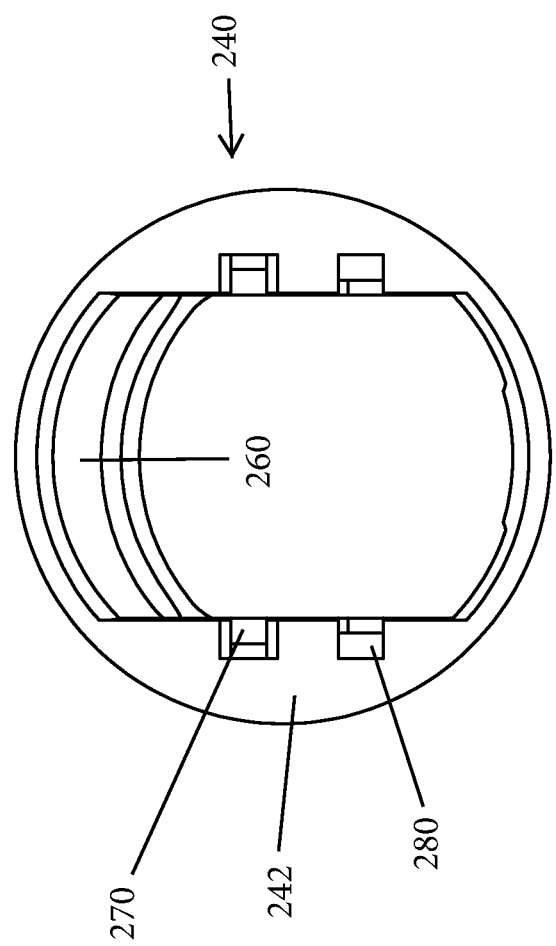
FIG. 27 is a front elevation view of a finial ring mount according to a first type.
Figure 28:
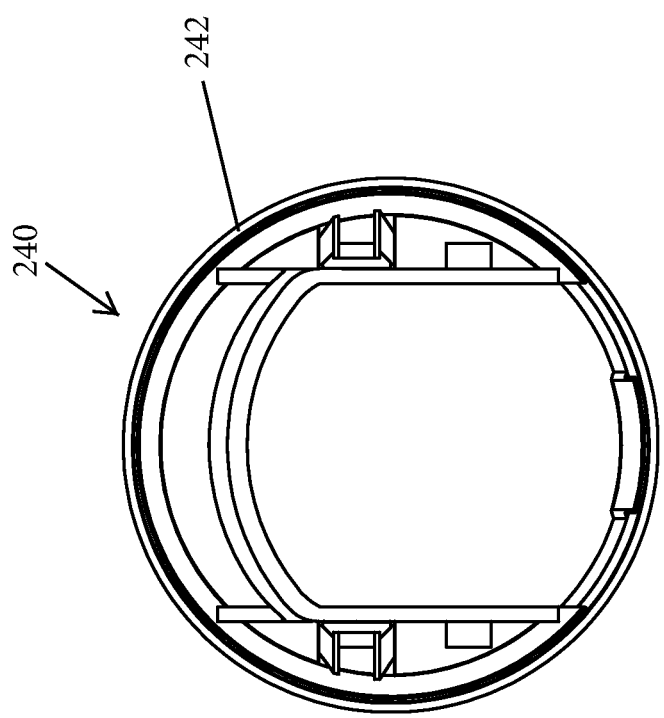
FIG. 28 is a rear elevation view thereof.
Figure 30A:
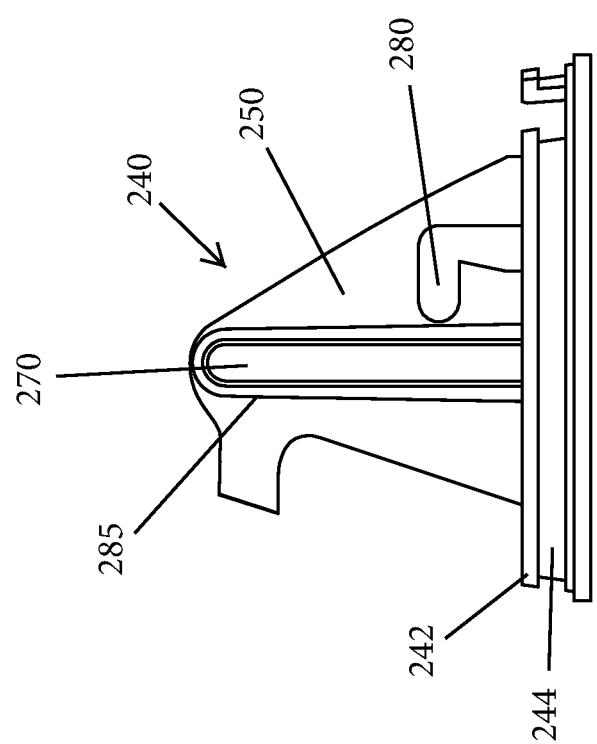
FIG. 30A is a side elevation view thereof.
Figure 30B:
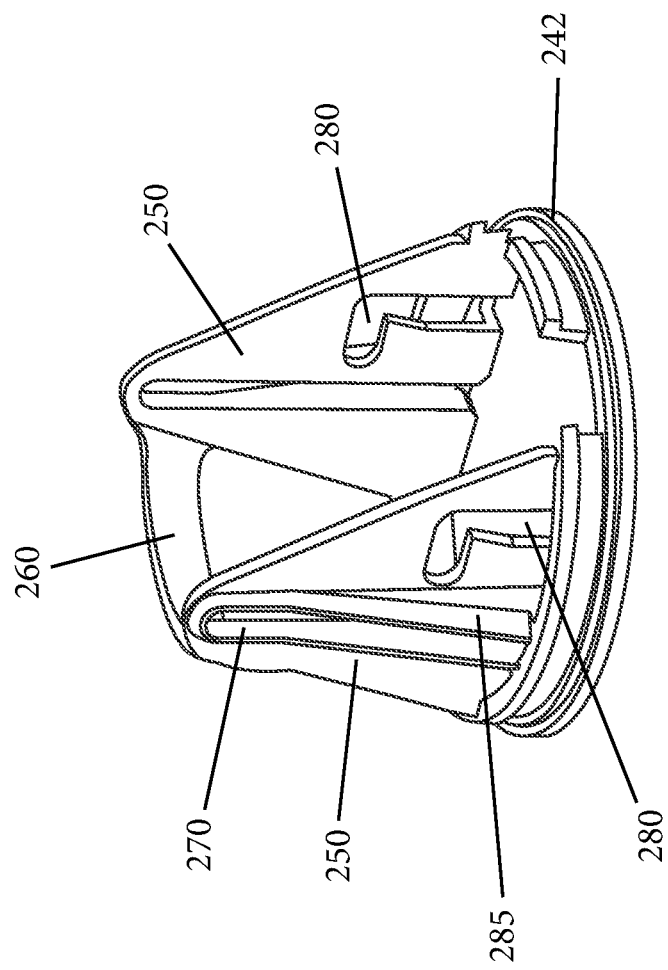
FIG. 30B is a side perspective view thereof.
Figure 31:
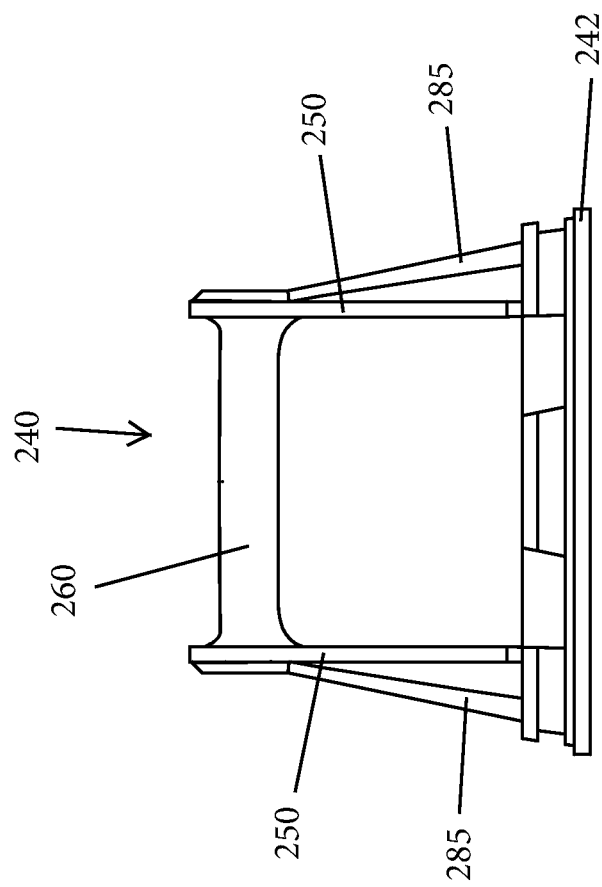
FIG. 31 is a bottom plan view thereof.
Figure 32:
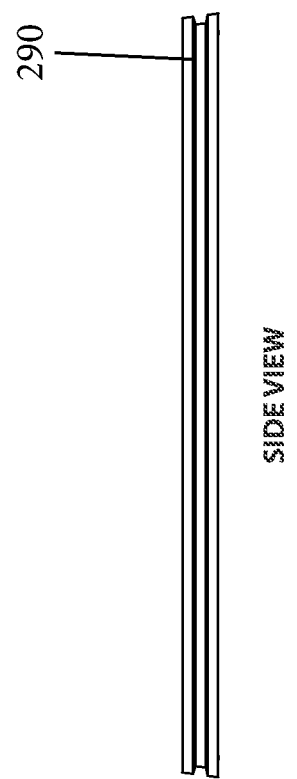
FIG. 32 is a side elevation view of seal member.

The shape of the second slot 280 is different between the finial ring mount 240 and the finial ring mount 241. As illustrated, the second slot 280 in the finial ring mount 240 has more of an L-shape, while the second slot 280 in the finial ring mount 241 has a closed end oblong shape. As shown in FIG. 27, in the finial ring mount 240 of the first type, both the first slot 270 and the second slot 280 are open at the end of the finial ring mount 240. In other words, both the of the first slot 270 and second slot 280 have one open end that forms an entrance into the respective slot. This is best appreciated in view of FIGS. 37B and 37C in which the slide fingers 217 are directed into the first slots 270, while the pins 227 of the knuckle are directed into the second slots 280. The end of the finial ring mount 240 at which the entrances (open ends) of the two slots 270, 280 are formed is wider than the region in which the remaining portions of the slots 270, 280 are formed and therefore, in order to advance fingers 217, pins 227 into the opposite closed ended portions of the slots 270, 280, the combined knuckle/main mount is pushed forward to in effect cause a snap-fitting type reception of the fingers 217, pins 227 into the respective closed end portions of the slots 270, 280, respectively. In other words, as the fingers 217 and pins 227 ride within the slots 270, 280 toward locations at which the opposing slots 270 and opposing slots 280 are more narrowly located, a secure, snap-fit is formed. As shown, at the closed end of the slot 280, there is a leg portion that extends toward the first slot 270 and as discussed herein, the pin 227 can travel therein during operation.

Conversely, as shown in FIG. 37A, when the finial ring mount 241 is used, it is physically separated so as to allow reception and capture of the coupled knuckle and main mount as described herein. In the illustrated separated state, the fingers 217 can be inserted into the first slots 270 and the pins 227 into the second slots 280 and then the separated ends of the finial ring mount 241 are brought back together and joined to one another.

Along an outer surface of the side wall 250 a peripheral wall 285 can be formed along the first slot 270 so as to form an outline thereof. The peripheral wall 285 thus protrudes outwardly from the outer surface of the side wall 250 and as shown, the height of the peripheral wall 285 (i.e., the distance the peripheral wall 280 protrudes from the side wall 250) can progressively decrease in a direction toward the free end of the side wall 250 (the end furthest from the stepped construction). As a result, the peripheral wall 280 can have a triangular shape. Structural features, such as ribs, can be used to further enhance the strength of the finial ring mount 240.

A seal member 290 in the form of an O-ring or gasket is disposed within the annular shaped receiving channel 244. As will be understood the use of the seal member 290 allows for larger manufacturing tolerances of the decorative metal finial. In addition, the seal member 290 provides a pressure fit connection to the finial mount that is invisible to the outside of the decorative finial, thereby giving the outside of the finial a clean/finished look.

Next with reference to FIGS. 35-38, the assembly of the end cap 200, 300 is illustrated. In a first step shown in FIG. 35, the grip member 500 is installed onto the first knuckle 220. The locking rails 507 are inserted into the locking slots 509 to effectuate a snap-fit therebetween. It will be appreciated that this step is eliminated when the second knuckle type is used in which the grip member 500' is formed by an overmold process. In a second step shown in FIG. 36 the knuckle 220 is coupled to the main mount 210 by separating the side walls 222 and inserting the arcuate shaped body portion into the notch 225. In other words, the arcuate shaped edge of the notch 225 is inserted into the channel 219 of the main mount 210 to effectuate a coupling (snap-fit) between the knuckle 220 and the main mount 210, while permitting rotation (pivoting) of the knuckle 220 relative to the fixed (stationary) main mount 210. The coupling of the knuckle 220' to the main mount 210 is accomplished using the same step.

In the third step, the finial ring mount 240 is spread open and is coupled (snapped over) to the assembled knuckle 220 and the main mount 210. The posts 227 are received within the second slot 280, while the slide fingers 217 are received within the first slots 270. This results in the secure coupling between these two parts, while still permit the rotation (pivoting) of the knuckle 220. In a fourth step, the seal member 290 is inserted into the channel 244.

Figure 39:
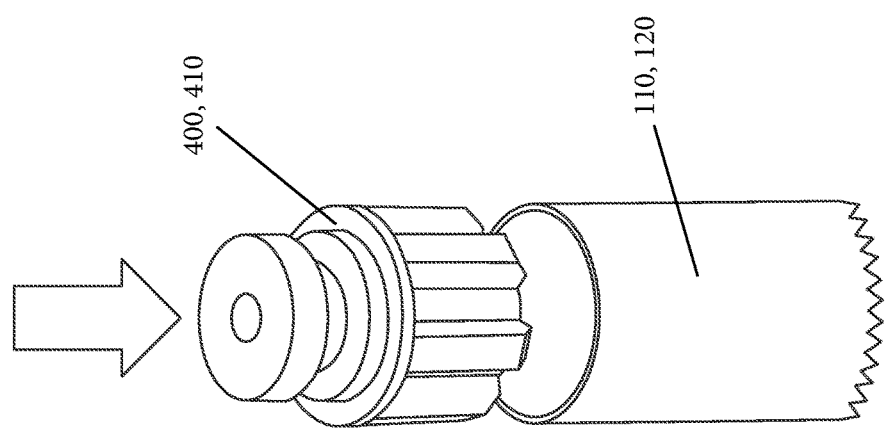
FIG. 39 shows installation of the first (or second) plug into the respective first (or second) rod.
Figure 40:
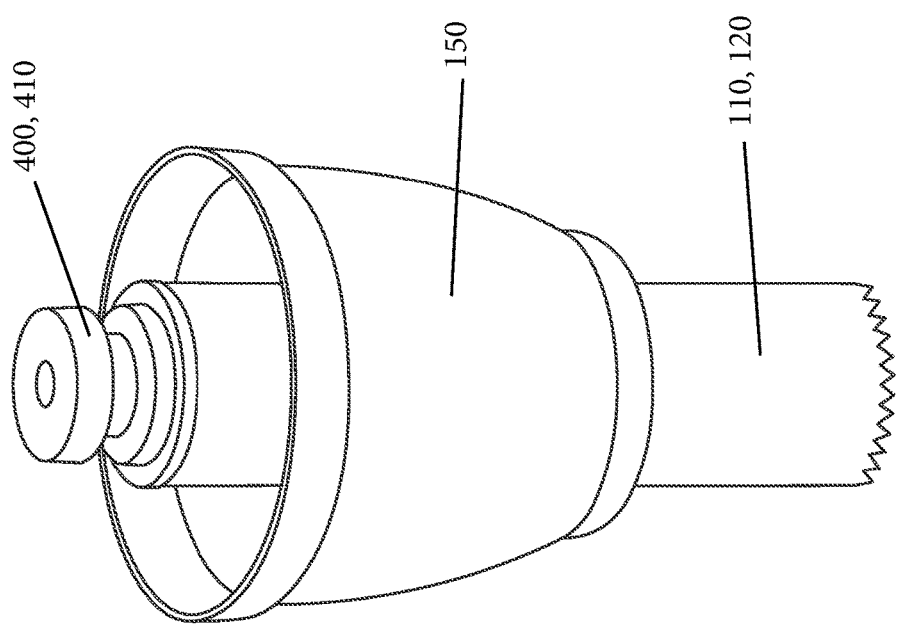
FIG. 40 shows installation of the finial over the plug and onto the rod.
Figure 41:
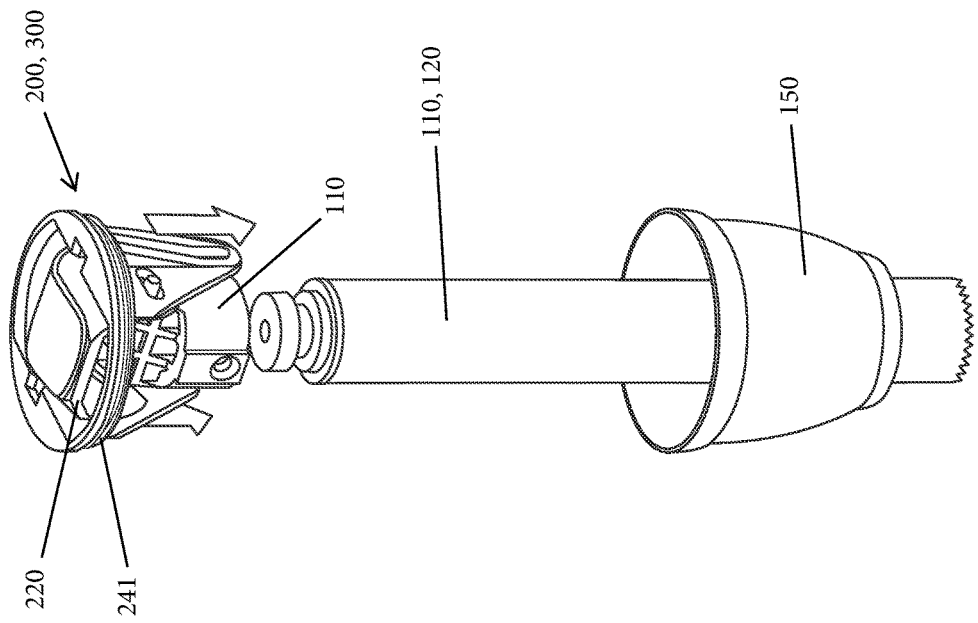
FIG. 41 shows attachment of the end cap (with finial ring mount of the second type) onto the plug.
Figure 42:
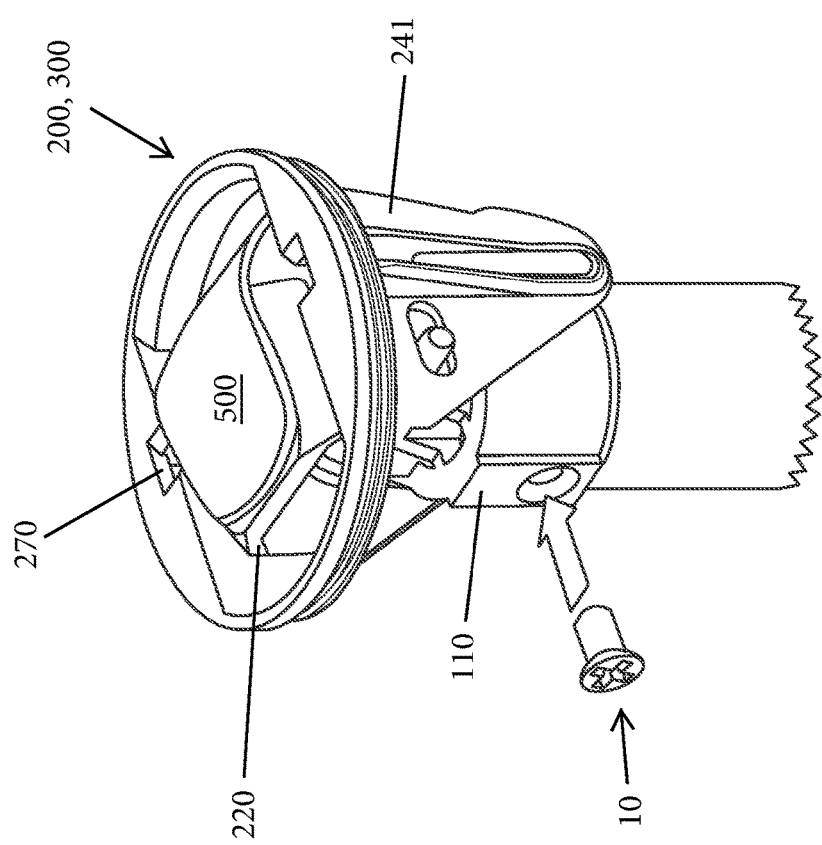
FIG. 42 shows the end cap being secured by installing the fastener.
Figure 43:
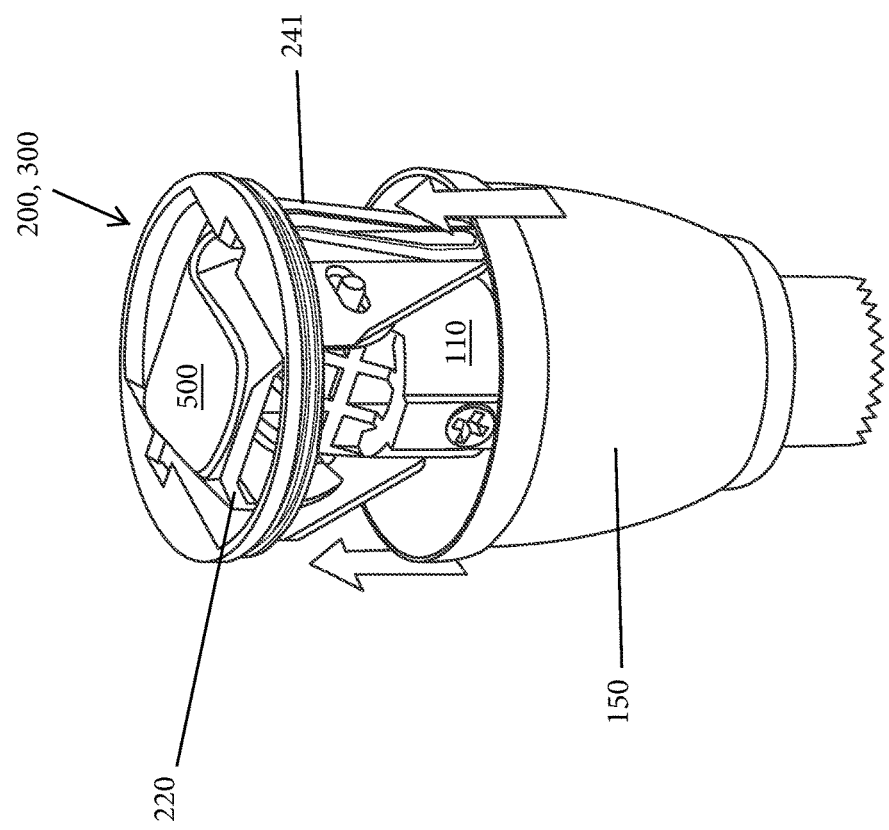
FIG. 43 shows the finial being pulled up onto the seal member and pressure fit in place.

FIGS. 39-43 shows additional assembly steps for coupling the end cap 200, 300 to the rods 110, 120. FIG. 39 shows insertion of the first plug 400 or second plug 410 into the first rod 110 or second rod 120. The coupling between these two parts is of a pressure type fit. The annular shaped channel 409 is left exposed and lies beyond the distal end of the rod. In FIG. 40, the finial 150 is slid over the plugs 400, 410 and onto the rods 110, 120. In FIG. 41, the end cap 200, 300 is coupled to the plug 400, 410, respectively. The through hole 216 is aligned with the channel 209 and then in the step illustrated in FIG. 42, the fastener 10 is inserted through the through hole 216 and enters the channel 209 but does not contact the floor of the channel 209 (so as to prevent lateral movement of the end cap 200, 300 during operation of the tension rod 100). In FIG. 43, the finial 150 is pulled up onto the seal member.

Figure 33:
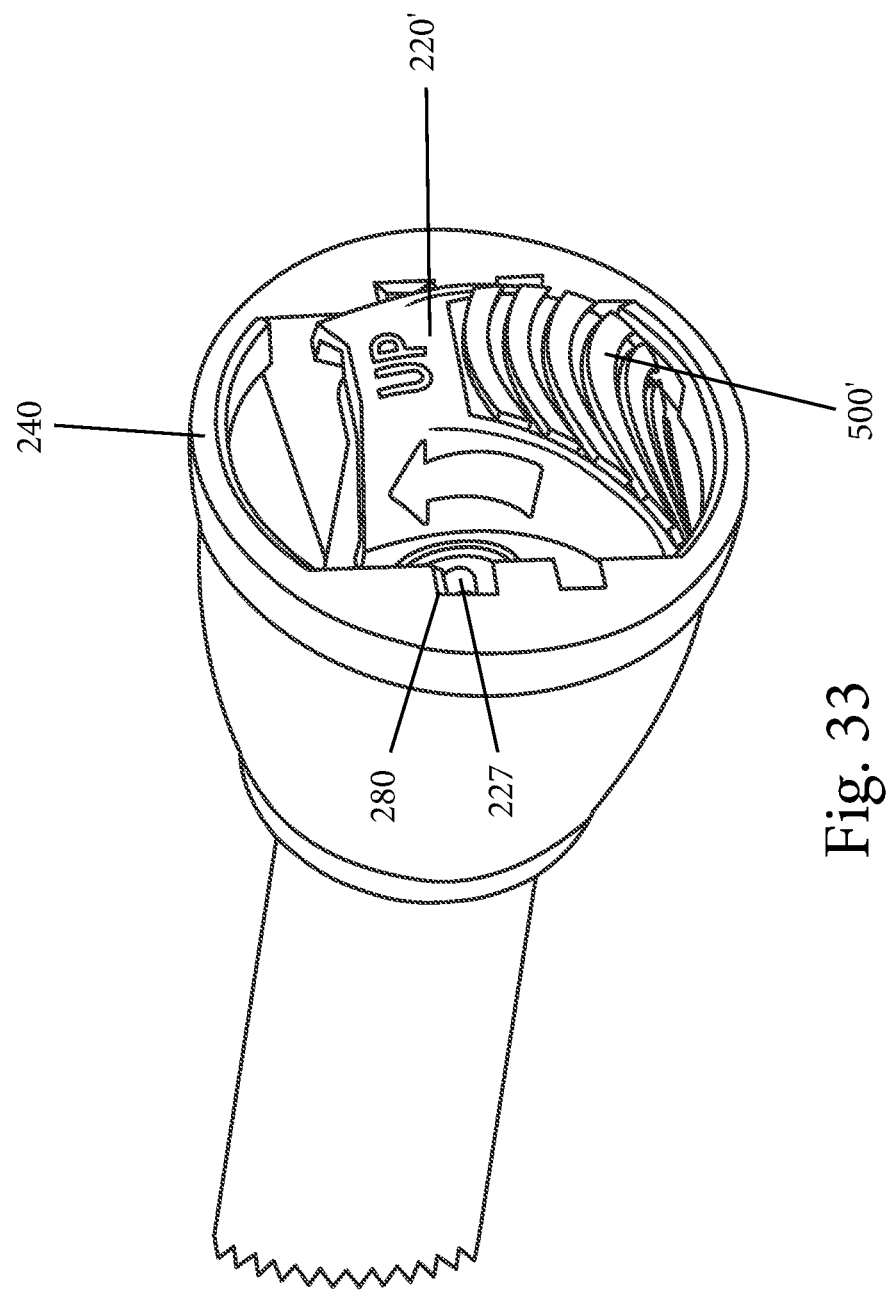
FIG. 33 is an end perspective view of the tension rod showing the end cap in a first (starting) position.
Figure 34:
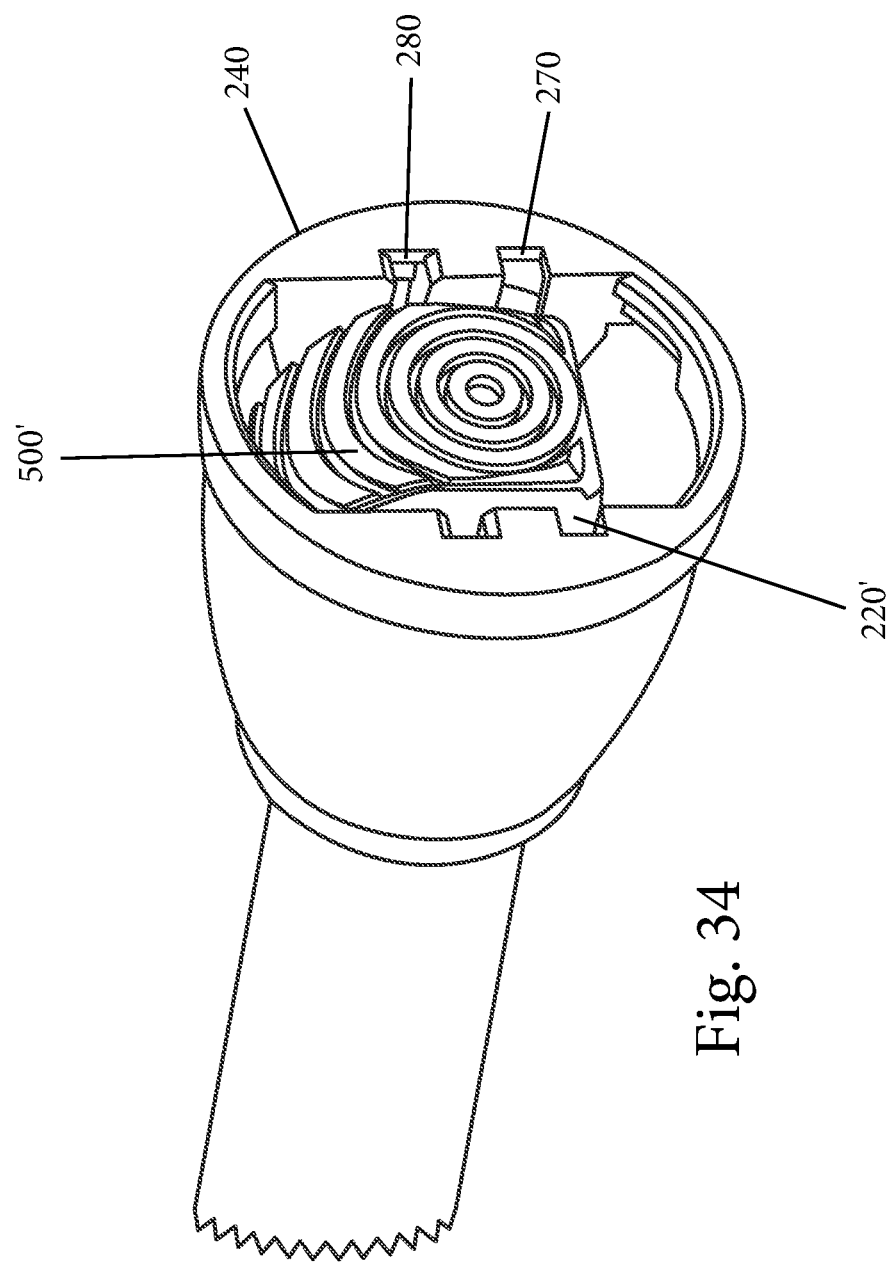
FIG. 34 is an end perspective view of the tension rod showing the end cap in a second (in-use) position.

FIGS. 33-34 illustrate the operation of the tension rod 100 and more particularly, show the tension rod 100 in a first (disengaged) position and a second (engaged) position. In the first position of FIG. 33, the end caps 200, 300 are located in the "UP" position in that the text 232 and direction arrows 233 point up (i.e., toward the ceiling, etc.). FIG. 33 is also the position in which the end caps 200, 300 ship and represents a starting point. The user needs to ensure that the end caps 200, 300 are facing in the "UP" position shown in FIG. 33 before causing tension to be applied to the tension rod 100 by pulling down on the rod as described herein. If for some reason the end caps 200, 300 are not in the proper position, the user will need to rotate the end caps 200, 300 to the "UP" positions. FIG. 34 represents a second position. In particular, after the user extends and locks the rods (poles) 110, 120 to fit the space between the two opposing support walls, the user pulls down on the tension rod 100 to engage the end cap cam mechanism (rotating knuckles). This downward pulling motion is translated into rotation of the grip member 500, 500' and knuckle 220, 220'. These end caps 200, 300 push in on the rod producing a great amount of tension on the rod 100.

As mentioned herein, there are many applications for the tension rod including holding drapery, cloths, shower curtains or even personal exercise, such as a pull-up bar.

Based on the foregoing discussion and in view of FIGS. 44A and 44B, it will be appreciated that the knuckle 220, 220' is centrally located on the main mount 210. The knuckle 220, 200' can pivot 90 degrees on a rotation access located on the main mount 210. Due to the limited range of the knuckle 220, 220', it can only rotate between 2 positions, position A and position B (FIGS. 33-34 and 44A and 44B). The distance between the access of revolution and the users wall increases when the knuckle rotates from position A to position B. This increase what creates tensions in the rod. FIGS. 44A and 33 reflect the first position and a distance A is delineated. FIGS. 44B and 34 reflect the second position and a distance B is delineated. Distance A is thus for the starting position and distance B is for the locked or engaged position. As shown, distance B is greater than distance A and as a result, tension is being exerted into the tension rod (rods 110, 120 thereof). It will be appreciated in view of FIGS. 44A and 44B, the rod (pole) plug and the main mount do not move during operation of the end cap but instead, the pivoting of the knuckle results not only in the knuckle pivoting but also in the finial ring mount 240 being drawn forward (away from the rod 110, 120). These movements are clearly seen by viewing the relative movements of the pins 227 in the second slots 280 and the fingers 217 in the first slots 270. The movement from the first position (FIG. 44A) to the second position (FIG. 44B) causes the pins 227 to move down within the leg portions of the second slots 280 and the fingers 217 move toward the closed ends of the first slots 270.

There is also the finial mount part 240 that is attached to the knuckle 220, 220' and the main mount 210. This part functions to hold a decorative finial 150 in place. This finial 150 covers all the internal workings from the user. When the knuckle 220, 220' rotates from position A to B the finial mount part 240 slides forward covering the knuckle 220, 220'.

As discussed herein, the end caps 200, 300 are to be considered separate assemblies that can be manufactured and packaged at a different location that the manufacture of the rod members and also the final assembly of the tension rod in which a pair of end caps are attached to the ends of the rod members using the plugs. The end caps can be packaged with the plugs in a common package that can be delivered to another site at which the final assembly is performed in which the plugs are installed in the ends of the tension rod and the end caps are coupled to the plugs to complete the assembled tension rod. The indicia, along with additional instructions, are provided to the user to instruct the user on operation of the tension rod and in particular, the user is instructed to make sure the knuckles at the ends of the tension rod are in the proper "UP" positions. Once the end caps are in the proper position, the user simply places the tension rod between the spaced apart (parallel) support surfaces, such as walls, and makes sure that the knuckles are in the "UP" positions and then the user pulls down on the tension rod causing engagement of the present cam mechanism which not only grippingly engages the support surfaces but also places the tension rod under tension, thereby ensuring that the tension rod remains in place and aptly functions as a weight bearing structure.

It will be appreciated that the rotation of the end caps is not a requirement to create the tension by the downward force. The rotation helps the user align the end caps properly after the pole is extended and locked to length. If the pole was not adjustable or if the pole locked in a non-twist action, such as a pin and hole (groove) method, then the end caps would not have to rotate. In some pole designs, rotation of the end caps may not be needed at all in order for the user to initiate the cam action described herein.

In addition, not only does the tension rod of the present invention hold superior weight relative to conventional tension rods, it is also easier to uninstall. All the user has to do is push up on the tension rod. The end caps automatically reset themselves and are ready to reengaged by pulldown again. This action makes it very easy to reposition the tension rod without having to unlock the poles.

Moreover, the tension rod of the present invention is made to accommodate different decorative finial shapes and sizes. The only parts that would have to be remade to fit are the finial ring mount and the seal member (O-ring). All other parts are universal to the tension rod.

In addition, the added shear weight of a shower curtain and hook, only help to reinforce the downward tension of the present tension rod.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. An end cap for use with a tension rod comprising:
   a main mount that is configured to be rotatably coupled to one end of the tension rod, the main mount rotating in a first direction relative to the one end of the tension rod; and
   a cam mechanism including a knuckle that is pivotally coupled to the main mount so as to pivot between a first position and a second position, the knuckle having an outer surface that is configured to selectively contact a support surface against which the tension rod is mounted and the cam mechanism is configured such that when a downward force is applied to the tension rod, the cam mechanism is engaged and the knuckle pivots to the second position, whereby the end cap applies a force to the tension rod resulting in the tension rod being placed under tension.

2. The end cap of claim 1, wherein the main mount has a hollow body portion having a first arcuate channel and a second arcuate channel in which the knuckle pivots to allow the knuckle to move between the first position and the second position.

3. The end cap of claim 2, wherein the main mount includes a web portion formed between the first arcuate channel and the second arcuate channel, the web portion defining one end of a hollow interior of the hollow body portion and being formed as a grid with a plurality of bounded openings.

4. The end cap of claim 3, wherein the first arcuate channel is formed in a first generally circular shaped structure located at a first end of the web portion and the second arcuate channel is formed in a second generally circular shaped structure located at a second end of the web portion.

5. The end cap of claim 2, wherein the main mount includes a pair of first guide members formed on opposite sides of the hollow body portion and being formed outside of the first and second arcuate channels.

6. The end cap of claim 2, wherein the main mount includes a planar landing that has a through hole formed therethrough such that the through hole forms an entrance into the hollow body portion.

7. The end cap of claim 6, further including a plug that is configured for reception into the one end of the tension rod, the plug having an annular shaped track that receives a distal end of a fastener that passes through the through hole, thereby rotatably coupling the main mount to the plug, the plug being configured to be maintained in a fixed orientation within the tension rod.

8. The end cap of claim 7, wherein the annular shaped track is formed in a first end portion of the plug that is received within a hollow interior of the main mount and the plug having a second end portion that is received within the one end of the tension rod, the second end portion having a plurality of ribs circumferentially formed thereabout.

9. The end cap of claim 8, wherein there is a shoulder formed between the first end portion and the second end portion, the shoulder defining a surface against which the one end of the tension rod seats.

10. The end cap of claim 1, further including a finial ring mount that has a first end portion that is configured to be coupled to the main mount and a second end portion that is configured to contact and seat against a decorative finial disposed about the tension rod for holding the finial in place.

11. The end cap of claim 10, wherein the second end portion comprises an annular shaped body having an annular shaped channel, and the first end portion comprises a pair of spaced apart side walls that are integral to and extend outwardly from the annular shaped body, the pair of side walls being connected by a bridge.

12. The end cap of claim 11, wherein each of the side walls includes a first slot and a slot, the first slot receiving a portion of the main mount for coupling the finial ring mount to the main mount and the slot second receiving a portion of the knuckle for coupling the knuckle to the finial ring mount.

13. The end cap of claim 12, wherein the portion of the main mount comprises a pair of slide fingers that are received within the first slots of the side walls, the portion of the knuckle comprising a pair of outwardly extending pins that are received within the second slots of the side walls.

14. The end cap of claim 11, further including a finial seal member that is received within the annular shaped channel and configured to seat against an inner surface of the finial.

15. The end cap of claim 13, wherein the first slots are oriented in a first direction and the second slots are oriented in a second direction that is perpendicular to the first direction.

16. The end cap of claim 2, wherein the knuckle has a pair of notches formed therein with each notch being defined by an arcuate shaped side wall edge which is received within one of the respective first arcuate channel and the second arcuate channel, the arcuate shaped side wall edge traveling within one of the first arcuate channel and the second arcuate channel when the knuckle pivots.

17. The end cap of claim 1, wherein the outer surface of the knuckle comprises an outer surface of a grip member that forms part of the knuckle, the grip member being formed of a material that is different than a material of the knuckle.

18. The end cap of claim 17, wherein the grip member comprises a grip pad that is securely attached to the knuckle and is disposed within a recess formed along the outer surface of the knuckle so as to be at countersunk relative to the knuckle.

19. The end cap of claim 17, wherein the grip member is formed by an overmold process.

20. The end cap of claim 17, wherein the grip member is formed of one of a rubber and TPR.

21. The end cap of claim 1, wherein the knuckle includes indicia identifying a direction of movement to pivot the knuckle from the first position to the second position.

22. The end cap of claim 1, wherein the first direction of rotation of the main mount is perpendicular to a longitudinal axis of the tension rod and the knuckle moves along a second direction of rotation that is different than the first direction of rotation of the main mount.

23. An end cap for use with a tension rod comprising:
a main mount that is configured to be rotatably coupled to one end of the tension rod, the main mount rotating in a first direction relative to the one end of the tension rod;
a cam mechanism including a knuckle that is pivotally coupled to the main mount so as to pivot between a first position and a second position, the knuckle having an outer surface that is configured to selectively contact a support surface against which the tension rod is mounted and the cam mechanism is configured such that when a downward force is applied to the tension rod, the cam mechanism is engaged and the knuckle pivots to the second position, whereby the end cap applies a force to the tension rod resulting in the tension rod being placed under tension; and
a finial ring mount that has a first end portion that is configured to be slidably coupled to the main mount and a second end portion that is configured to contact and seat against a decorative finial disposed about the tension rod for holding the finial in place, wherein when the knuckle pivots to the second position, the finial ring mount slides forward in a direction away from the main mount.

24. A tension rod comprising:
a first rod having one end defining a first end of the tension rod;
a second rod having one end defining a second end of the tension rod, wherein the second rod has a diameter greater than the first rod to allow the second rod to at least partially receive the first rod;
a first plug that is coupled to the first end of tension rod;
a second plug that is coupled to the second end of the tension rod;
a first end cap rotatably coupled to the first plug and a second end cap rotatably coupled to the second plug, each of the first end cap and the second end cap comprising:
a main mount that is configured to be rotatably coupled to one of the first plug and the second plug; and
a cam mechanism including a knuckle that is pivotally coupled to the main mount so as to pivot between a first position and a second position, the knuckle having an outer surface that is configured to selectively contact a support surface against which the tension rod is mounted and the cam mechanism is configured such that when a downward force is applied to the tension rod, the cam mechanism is engaged and the knuckle pivots to the second position, whereby the end cap applies a force to the tension rod resulting in the tension rod being placed under tension.

* * * * *